United States Patent
Rangaprasad et al.

(10) Patent No.: US 11,785,176 B1
(45) Date of Patent: Oct. 10, 2023

(54) AMBIENT LIGHT SENSOR-BASED LOCALIZATION

(71) Applicant: Apple Inc., Cupertino, CA (US)

(72) Inventors: Arun Srivatsan Rangaprasad, Sunnyvale, CA (US); Anselm Grundhoefer, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 40 days.

(21) Appl. No.: 17/173,525

(22) Filed: Feb. 11, 2021

Related U.S. Application Data

(60) Provisional application No. 62/982,819, filed on Feb. 28, 2020.

(51) Int. Cl.
*H04N 5/58* (2006.01)
*G01J 1/42* (2006.01)
*H04N 23/70* (2023.01)

(52) U.S. Cl.
CPC .............. *H04N 5/58* (2013.01); *G01J 1/4204* (2013.01); *H04N 23/70* (2023.01)

(58) Field of Classification Search
CPC .......... H04N 5/58; H04N 5/235; H04N 23/70; G01J 1/4204
See application file for complete search history.

(56) References Cited

U.S. PATENT DOCUMENTS

| | | | |
|---|---|---|---|
| 8,989,769 B2 | 3/2015 | Moeglein et al. | |
| 9,366,749 B2 | 6/2016 | Grokop et al. | |
| 9,838,119 B1* | 12/2017 | Stein | G01S 3/7835 |
| 10,324,195 B2 | 6/2019 | Garin et al. | |
| 10,395,421 B2 | 8/2019 | Kunkel et al. | |
| 2008/0267450 A1 | 10/2008 | Sugimoto et al. | |
| 2014/0011518 A1* | 1/2014 | Valaee | H04W 4/33 455/456.1 |
| 2019/0005677 A1* | 1/2019 | Grau | G06T 7/74 |
| 2020/0221562 A1* | 7/2020 | Roberts | H04W 4/80 |

OTHER PUBLICATIONS

Yu, Zhiato, "Smartphone Sensor Fusion For Indoor Localization: A Deep LSTM Approach"; pp. 1-53, Dec. 15, 2018.

* cited by examiner

*Primary Examiner* — Michael E Teitelbaum
(74) *Attorney, Agent, or Firm* — Thompson Hine LLP

(57) ABSTRACT

Various implementations disclosed herein include devices, systems, and methods that estimate a location of a light source based on ambient light data. For example, an example process may include acquiring ambient light data from an ambient light sensor (ALS) during movement of a device in a physical environment, acquiring motion data from a motion sensor during the movement of the device, determining, based on the ambient light data and the motion data, estimates of three-dimensional (3D) locations of a light source with respect to the device during the movement of the device, and tracking a location of the device in a 3D coordinate system during the movement of the device based on the estimates of the 3D locations of the light source with respect to the device during the movement of the device.

20 Claims, 10 Drawing Sheets

AMBIENT LIGHT SENSOR-BASED LOCALIZATION

CROSS-REFERENCE TO RELATED APPLICATION

This application claims the benefit of U.S. Provisional Application Ser. No. 62/982,819 filed Feb. 28, 2020, which is incorporated herein in its entirety.

TECHNICAL FIELD

The present disclosure generally relates to the field of mobile devices, and in particular, to systems, methods, and devices that process localization of a mobile device.

BACKGROUND

The implementation of localization on a mobile device, such as a smartphone, allows a user and/or applications on the device to locate the device's position and/or assist with navigation within a physical environment, such as a building. Localization of a mobile device may be determined using sensors on the device (e.g., inertial measurement unit (IMU), gyroscope, etc.), WIFI localization, or other techniques (e.g., visual inertial odometry (VIO) from image data). A global positioning system (GPS) system can also provide an approximate position of the mobile device, however, GPS is usually limited indoor due to the degradation of signals by the building structures. Additionally, existing techniques for localization of a device may be inefficient and require higher computation with increased power consumption using a mobile device, for example, based on a user capturing photos or video or other sensor data while walking around a room. Moreover, existing techniques may fail to provide sufficiently accurate and efficient approximate localization in real time environments when there is a need for fast localization.

SUMMARY

Various implementations disclosed herein include devices, systems, and methods that provide a quick and approximate localization for a device based on ambient light data from an ambient light sensor (ALS) and motion data from a motion sensor in the device (e.g., inertial measurement unit (IMU), gyroscope, an accelerometer, etc.) using locally-available static light sources for triangulation/localization. This involves determining running estimates (e.g., probabilistic, deterministic, etc.) of where the light sources are with respect to the device. Determining three-dimensional (3D) locations of a light source with respect to the device during movement of the device can be based on the ambient light data and the motion data. It may be desirable to quickly and efficiently track a location of the moving device in a 3D coordinate system for various reasons, e.g., during real time extended reality (XR) environments that includes depictions of a physical environment including real physical objects and virtual content.

Ambient light sensors provide measurements of the illuminance of an environment and can do so at relatively high frequency, while an IMU, for example, provides alignment information. An algorithm that finds locally higher values of illuminance can be used to locate light sources, which can then be used for localization. One benefit of using ambient light sensors over other methods of localization (e.g., camera based visual inertial odometry (VIO)) is lower power consumption and fast computation. Ambient light sensors do not require processing of all the pixels of an entire image, but instead work with a single luminance value (e.g., a photometric measure of the luminous intensity per unit area of light traveling in a given direction) for each sensing element of the ambient light sensor. Many light sources are not moving and are thus fixed with respect to a world frame. The fixed light sources can be used an anchors during a localization process as described herein. In the case of headsets, a pose tracking sensor may be used instead of an IMU. Furthermore, visual trackers such as QR codes, Aruco markers, April tags, or the like, can also be used for alignment estimation.

Some implementations of this disclosure involve an exemplary method of tracking a location of a moving device in a 3D coordinate system based on estimates of the 3D locations of the light source with respect to the device. The exemplary method initially involves, at a device having a processor, an ambient light sensor (ALS), and a motion sensor (e.g., IMU, gyroscope, accelerometer, etc.), acquiring ambient light data from the ALS during movement of the device in a physical environment. The ambient light data corresponds to diffuse light received by the ALS in the physical environment. Additionally, the physical environment includes at least one light source (e.g., a central ceiling light fixture). For example, unlike an RGB camera that provides dense pixel data about specific portions of the environment, an ALS provides one or more light characteristic values corresponding to diffuse light coming from a broader direction in the environment. For example, a light characteristic value may include one or more luminance values and/or chrominance values (e.g., a CIE-XYZ Color Coordinate System, or the like). In some implementations, the ALS may have a single sensor. Alternatively, the ALS may have a grid (e.g., 8×8) of sensing elements. In some implementations, the ambient light data may be directional, e.g., providing a level of ambient light in a relative direction the sensor is facing. In some implementations, the level of ambient light can be in a more discrete region, e.g., using a "pinhole" to limit the direction of the light received by sensing elements of the ALS.

The exemplary method further involves acquiring motion data from the motion sensor during the movement of the device. For example, the motion data may be motion trajectory data generated from an accelerometer or a gyroscope located within the device. In some implementations, the motion data may be motion trajectory data generated from an inertial measurement unit (IMU) that measures and reports a device's specific force, angular rate, and sometimes the orientation of the device, using a combination of accelerometers, gyroscopes, and/or magnetometers.

The exemplary method further involves determining, based on the ambient light data and the motion data, estimates of 3D locations of the light source with respect to the device during the movement of the device. In some implementations, the estimates of 3D locations of the light source could be probabilistic. For example, estimating the 3D location of the light source may involve generating and updating a 3D probability map. In some implementations, estimating the 3D location of the light source may involve tracking probabilistic location estimates for multiple light sources. For example, multiple light sources may be distinguished from one another based on spectral properties, such as luminance and/or chrominance values. For example, colors, such as CIE-XYZ, or even a more fine-grained multispectral sensing, allow to distinguish the spectral properties of each light source. In some implementations, the electromagnetic spectrum is measured with multiple filters to be able to distinguish multiple light sources. In some implementations, a light source may be infrared radiation (IR), sometimes called infrared light, which is electromagnetic radiation with wavelengths longer than those of visible light. Each light source may provide unique spectral properties such as amplitude, wavelength, and frequency that can be measured and compared to distinguish between multiple light sources.

In some implementations, the estimates of 3D locations of the light source could be deterministic. For example, estimating the 3D location of the light source may involve determining deterministic estimates that includes iteratively updating location estimates for the light source in the physical environment at a particular frequency (e.g., every five seconds). For example, each iteration can include determining a location estimate for the light source based on the 3D location, and updating the 3D location of the location estimate for the light source in a 3D grid. In some implementations, the 3D grid includes a notification (e.g., binary, or the like) of the location estimate of the light source. In some implementations, each iteration could include updating the estimates of the position of the light source using camera images taken at the particular frequency of each iteration, or at another interval, such as once every minute. Using the camera image to verify the location of the light source may improve accuracy of the determining estimates using the ambient light data, without compromising computation budget. For example, recalibrating the location of the light source with image data once per minute, but tracking estimates for the location of the light source using ambient light data continuously.

The exemplary method further involves tracking a location of the device in a 3D coordinate system during the movement of the device based on the estimates of the 3D locations of the light source with respect to the device during the movement of the device. For example, tracking location of a device can provide continuity during an XR experience while VIO tracking is used intermittently or at varying rates (e.g., frames per second (FPS)). In some implementations, for example, tracking a location of the device in a 3D coordinate system can be used to localize two devices to one another based on ALS which may be used to provide different perspectives of virtual objects in an XR experience. In some implementations, for example, tracking a location of the device in a 3D coordinate system can be used to render a virtual object using light source estimation from the ALS. For example, for two different color of lights, as a virtual object moves in an XR environment, the shadow effects may change depending on a distance from each respective light source.

In some implementations, the exemplary method involves tracking multiple light sources. For example, in some implementations, determining probabilistic estimates includes tracking probabilistic location estimates for the first light source and a second light source in the physical environment, where the tracking is based on differences in spectral properties (e.g., luminance values, wavelength, etc.) of the first light source and the second light source.

In some implementations, the exemplary method involves providing continuity during an XR experience while VIO tracking is used intermittently or at varying rates/FPS. For example, looking at a virtual object in an XR environment, such as a virtual calendar, looking away from the virtual calendar (turning off VIO tracking), than looking back at the virtual calendar while maintaining continuity of the virtual calendar via the Ambient light data. In some implementations, the tracking provides continuity between time periods during presentation of an XR environment during which a second tracking technique (e.g., VIO) is altered (e.g., turned off or on low power mode) based on inclusion or exclusion of virtual content. In some implementations, the exemplary method further involves, during a first time period, tracking the device using VIO, positioning a virtual object in an XR environment based on the tracking of the device during the first time period, and presenting a first view of the XR environment including the virtual object, during a second time period after the first time period, presenting a second view of the XR environment and, based on the second view excluding the virtual object, (e.g., looking away from the virtual calendar) tracking the device using the ambient light data and altering (e.g., discontinuing or slowing down) the tracking of the device using VIO, and during a third time period after the second time period, positioning the virtual object in a third view of the XR environment (e.g., when the user looks back at the place where the virtual calendar was) based on tracking the device using the ambient light data and using VIO. Thus, when the user looks back at the calendar there is faster localization.

In some implementations, the exemplary method involves localizing two devices to one another based on ambient light data which may be used to provide different perspectives of virtual objects. For example, virtual object rendering on a conference table, where every device can be localized using the ALS and a flickering device on the table (e.g. IR device on a table that flickers but is not visible to the human eye). For example, in some implementations, the device is a first device and the ambient light data is first ambient light data, the method further including determining relative locations of the first device and a second device based on determining that the first ambient light data acquired at the first device and second ambient light data acquired at the second device correspond to the light source. In some implementations, the first device and second device provide different views of a virtual object based on the relative locations of the first device and the second device. In some implementations, the light source is a beacon producing light having a distinctive characteristic (e.g., a flickering IR device).

In some implementations, the exemplary method involves rendering a virtual object using light source estimation from the ALS. For example, a virtual object moving across a viewing area in an XR environment would appear differently if there was one yellow light and one white light at different locations, there would be different color shadows, etc. For example, in some implementations, the light source is a first light source that generates a first type of lighting (e.g., yellow light), wherein the physical environment further includes a second light source that generates a second type of lighting (e.g., white light) that is different than the first type of lighting. The method may further include providing, at the device, an XR environment that includes a virtual object within a view of the physical environment. In some implementations, the method further includes determining probabilistic estimates of 3D locations of the first light source and the second light source during movement of the virtual object from a first location to a second location, wherein a first location of the virtual object is closer to the first light source than the second light source, and a second location of the virtual object is closer to the second light source than the first light source. In some implementations, the method further includes determining, at the first location of the virtual object, a first light source estimation effect of the first light source and the second light source based on the location of the virtual object with respect to the first light source and the second light source and based on the first type of lighting generated by the first light source and the second type of lighting generated by the second light source, providing, based on the first light source estimation effect, the virtual object at the first location, determining, at the second location of the virtual object, a second light source estimation effect of the first light source and the second light source based on the location of the virtual object with respect to the first light source and the second light source and based on the first type of lighting generated by the first light source and the second type of lighting generated by the second light source, and providing, based on the second light source estimation effect, the virtual object at the second location.

In some implementations, the exemplary method further includes acquiring image data (e.g., RGB data or the like) of the physical environment captured via a camera on the device, determining, based on the image data, the 3D location of the light source with respect to the device, and updating (e.g., calibrating) the estimated 3D location of the light source that is based on the ambient light data and the motion data based on the determined 3D location of the light source from the image data. In some implementations, the image data is acquired at a frequency that is lower (e.g., once per minute) than a frequency the ambient light data and the motion data is acquired (e.g., once per second). For example, image data may be acquired to recalibrate and update the estimated location of the light source as determined by the ambient light data and motion data. The updated estimation of the light source improves the accuracy of the location estimation without compromising on computation budget. For example, computations for determining a location of a light source via image data requires more computations and processing power than the ambient light data computations. Thus, utilizing the image data less frequently for light source location determination (e.g., higher computation power and higher accuracy) and more frequently using ambient light data for light source location estimation (e.g., lower computation power and less accurate than using image data) improves overall processing efficiency.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
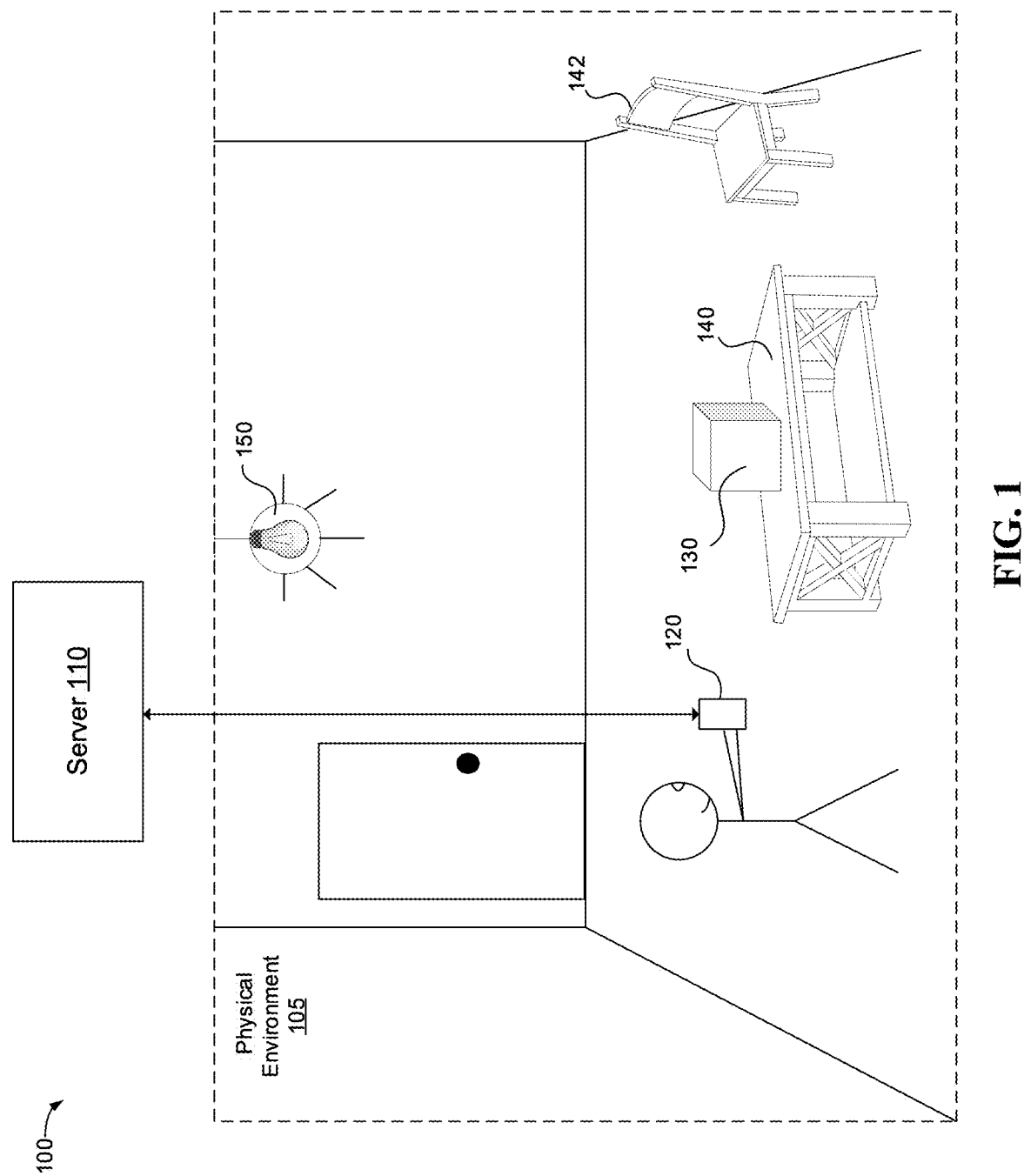
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 is a block diagram of an example operating environment 100 in accordance with some implementations. In this example, the example operating environment 100 illustrates an example physical environment 105 that includes an object 130, table 140, chair 142, and a light source 150. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a server 110 and a device 120. In an exemplary implementation, the operating environment 100 does not include a server 110, and the methods described herein are performed on the device 120.

In some implementations, the server 110 is configured to manage and coordinate an experience for the user. In some implementations, the server 110 includes a suitable combination of software, firmware, and/or hardware. The server 110 is described in greater detail below with respect to FIG. 2. In some implementations, the server 110 is a computing device that is local or remote relative to the physical environment 105. In one example, the server 110 is a local server located within the physical environment 105. In another example, the server 110 is a remote server located outside of the physical environment 105 (e.g., a cloud server, central server, etc.). In some implementations, the server 110 is communicatively coupled with the device 120 via one or more wired or wireless communication channels (e.g., BLUETOOTH, IEEE 802.11x, IEEE 802.16x, IEEE 802.3x, etc.).

In some implementations, the device 120 is configured to present an environment to the user. In some implementations, the device 120 includes a suitable combination of software, firmware, and/or hardware. The device 120 is described in greater detail below with respect to FIG. 3. In some implementations, the functionalities of the server 110 are provided by and/or combined with the device 120.

In some implementations, the device 120 is a handheld electronic device (e.g., a smartphone or a tablet) configured to present content to the user. In some implementations, the user 102 wears the device 120 on his/her head. As such, the device 120 may include one or more displays provided to display content. For example, the device 120 may enclose the field-of-view of the user 102. In some implementations, the device 120 is replaced with a chamber, enclosure, or room configured to present content in which the user 102 does not wear or hold the device 120.

Figure 2:
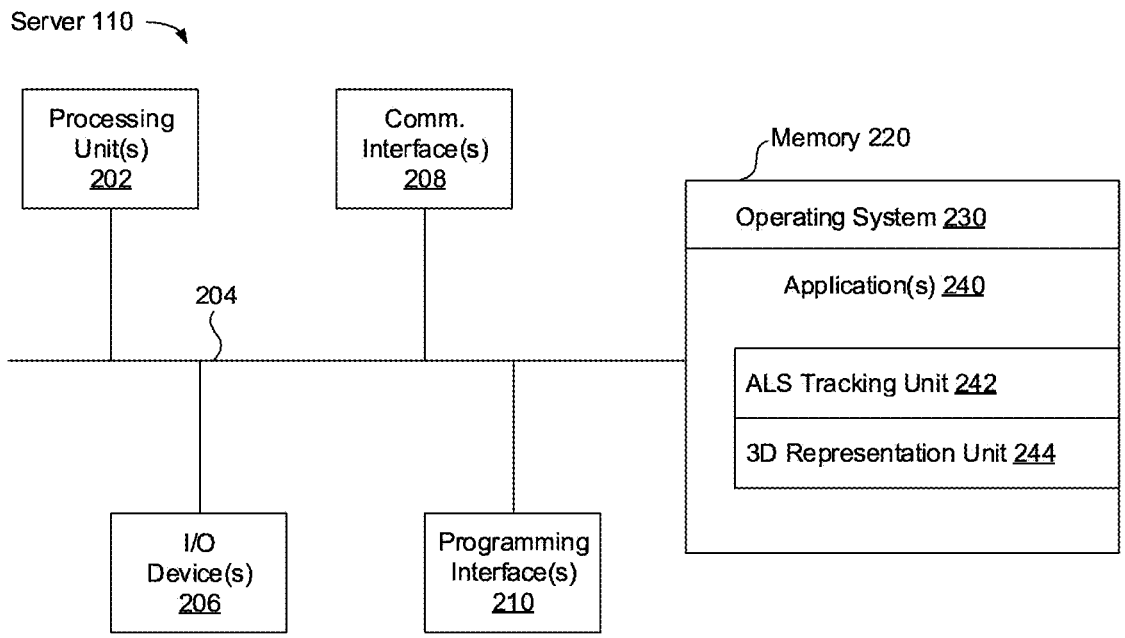
FIG. 2 is a block diagram of an example server in accordance with some implementations.

FIG. 2 is a block diagram of an example of the server 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the server 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 includes a non-transitory computer readable storage medium. In some implementations, the memory 220 or the non-transitory computer readable storage medium of the memory 220 stores the following programs, modules and data structures, or a subset thereof including an optional operating system 230 and one or more applications 240.

The operating system 230 includes procedures for handling various basic system services and for performing hardware dependent tasks. In some implementations, the applications 240 are configured to manage and coordinate one or more experiences for one or more users (e.g., a single experience for one or more users, or multiple experiences for respective groups of one or more users).

The applications 240 include an ALS tracking unit 242 and a three-dimensional (3D) representation unit 244. The ALS tracking unit 242 and the 3D representation unit 244 can be combined into a single application or unit or separated into one or more additional applications or units.

The ALS tracking unit 242 is configured with instructions executable by a processor to obtain sensor data (e.g., ambient light data, motion data, etc.) and track a location of a moving device in a 3D coordinate system based on estimates of the 3D locations of the light source with respect to the device using one or more of the techniques disclosed herein. For example, the ALS tracking unit 242 analyzes ambient light data from an ALS and motion data from a motion sensor (e.g., gyroscope, accelerometer, etc.) and/or other sources of physical environment information (e.g., camera positioning information from a camera's SLAM system, a visual inertial odometry (VIO) system, or the like) to track light source and device location information for 3D reconstruction (e.g., 3D representations of virtual content generated for an extended reality (XR) experience that can display both real world objects of a physical environment and virtual content). In some implementations, the ALS tracking unit 242 includes a light source assessment unit to determine locations of each light source, and a device location assessment unit to determine and track the location of the device (e.g., during movement of the device).

The 3D representation unit 244 is configured with instructions executable by a processor to obtains tracking information for the device, image data (e.g., RGB and depth data), and other sources of physical environment information (e.g., camera positioning information from a camera's SLAM system, VIO, or the like), and generates 3D representation data using one or more techniques disclosed herein. For example, the 3D representation unit 244 obtains ALS tracking data from the ALS tracking unit 242, obtains or generates segmentation data (e.g., RGB-S data) based on obtained image data (e.g., RGB and depth data), obtains other sources of physical environment information (e.g., camera positioning information), and generates a 3D representation (e.g., a 3D mesh representation, a 3D point cloud with associated semantic labels, or the like) for an XR experience.

Although these elements are shown as residing on a single device (e.g., the server 110), it should be understood that in other implementations, any combination of the elements may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
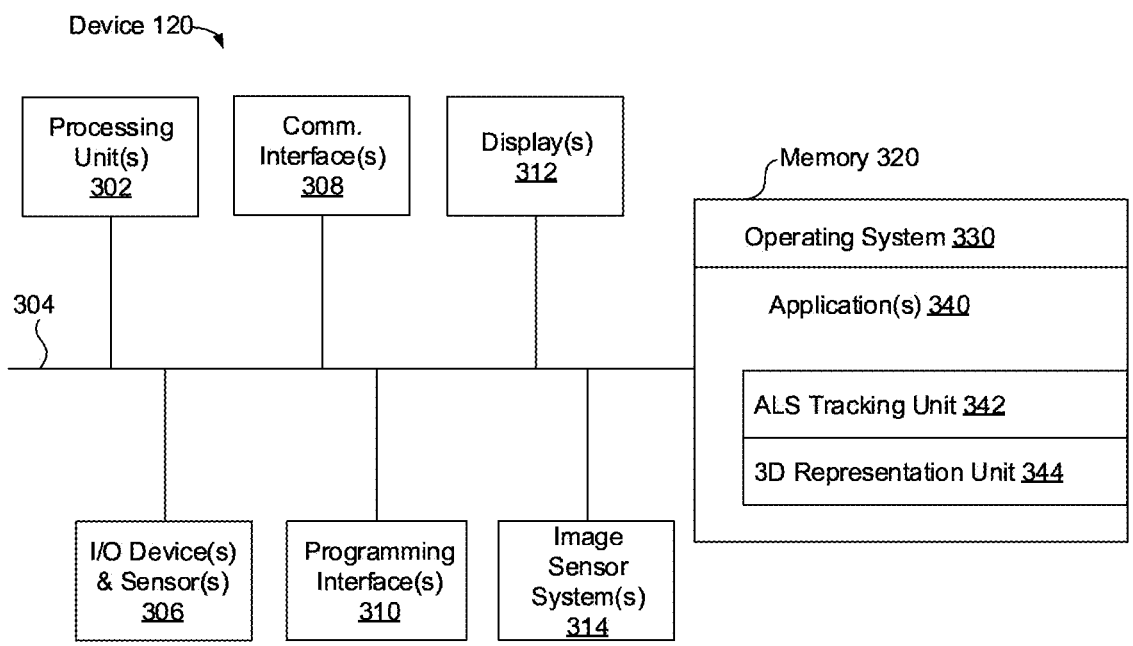
FIG. 3 is a block diagram of an example device in accordance with some implementations.

FIG. 3 is a block diagram of an example of the device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 310, one or more AR/VR displays 312, one or more interior and/or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, an ambient light sensor (ALS), one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 312 are configured to present the experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the device 120 includes a single display. In another example, the device 120 includes an display for each eye of the user.

In some implementations, the one or more image sensor systems 314 are configured to obtain image data that corresponds to at least a portion of the physical environment 105. For example, the one or more image sensor systems 314 include one or more RGB cameras (e.g., with a complimentary metal-oxide-semiconductor (CMOS) image sensor or a charge-coupled device (CCD) image sensor), monochrome cameras, IR cameras, event-based cameras, and/or the like. In various implementations, the one or more image sensor systems 314 further include illumination sources that emit light, such as a flash. In various implementations, the one or more image sensor systems 314 further include an on-camera image signal processor (ISP) configured to execute a plurality of processing operations on the image data including at least a portion of the processes and techniques described herein.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 includes a non-transitory computer readable storage medium. In some implementations, the memory 320 or the non-transitory computer readable storage medium of the memory 320 stores the following programs, modules and data structures, or a subset thereof including an optional operating system 330 and one or more applications 340.

The operating system 330 includes procedures for handling various basic system services and for performing hardware dependent tasks. In some implementations, the applications 340 are configured to manage and coordinate one or more experiences for one or more users (e.g., a single experience for one or more users, or multiple experiences for respective groups of one or more users).

The applications 340 include an ALS tracking unit 342 and a 3D representation unit 344. The ALS tracking unit 342 and the 3D representation unit 344 can be combined into a single application or unit or separated into one or more additional applications or units.

The ALS tracking unit 342 is configured with instructions executable by a processor to obtain sensor data (e.g., ambient light data, motion data, etc.) and track a location of a moving device in a 3D coordinate system based on estimates of the 3D locations of the light source with respect to the device using one or more of the techniques disclosed herein. For example, the ALS tracking unit 342 analyzes ambient light data from an ALS and motion data from a motion sensor (e.g., gyroscope, accelerometer, etc.) and/or other sources of physical environment information (e.g., camera positioning information from a camera's SLAM system, VIO, or the like) to track light source and device location information for 3D reconstruction (e.g., 3D representations of virtual content generated for an XR experience that also displays a physical environment). In some implementations, the ALS tracking unit 342 includes a light source assessment unit to determine locations of each light source, and a device location assessment unit to determine and track the location of the device (e.g., during movement of the device).

The 3D representation unit 344 is configured with instructions executable by a processor to obtains tracking information for the device, image data (e.g., RGB and depth data), and other sources of physical environment information (e.g., camera positioning information from a camera's SLAM system, VIO, or the like), and generates 3D representation data using one or more techniques disclosed herein. For example, the 3D representation unit 344 obtains ALS tracking data from the ALS tracking unit 342, obtains or generates segmentation data (e.g., RGB-S data) based on obtained image data (e.g., RGB and depth data), obtains other sources of physical environment information (e.g., camera positioning information), and generates a 3D representation (e.g., a 3D mesh representation, a 3D point cloud with associated semantic labels, or the like) for an XR experience.

Although these elements are shown as residing on a single device (e.g., the device 120), it should be understood that in other implementations, any combination of the elements may be located in separate computing devices. Moreover, FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules (e.g., applications 340) shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
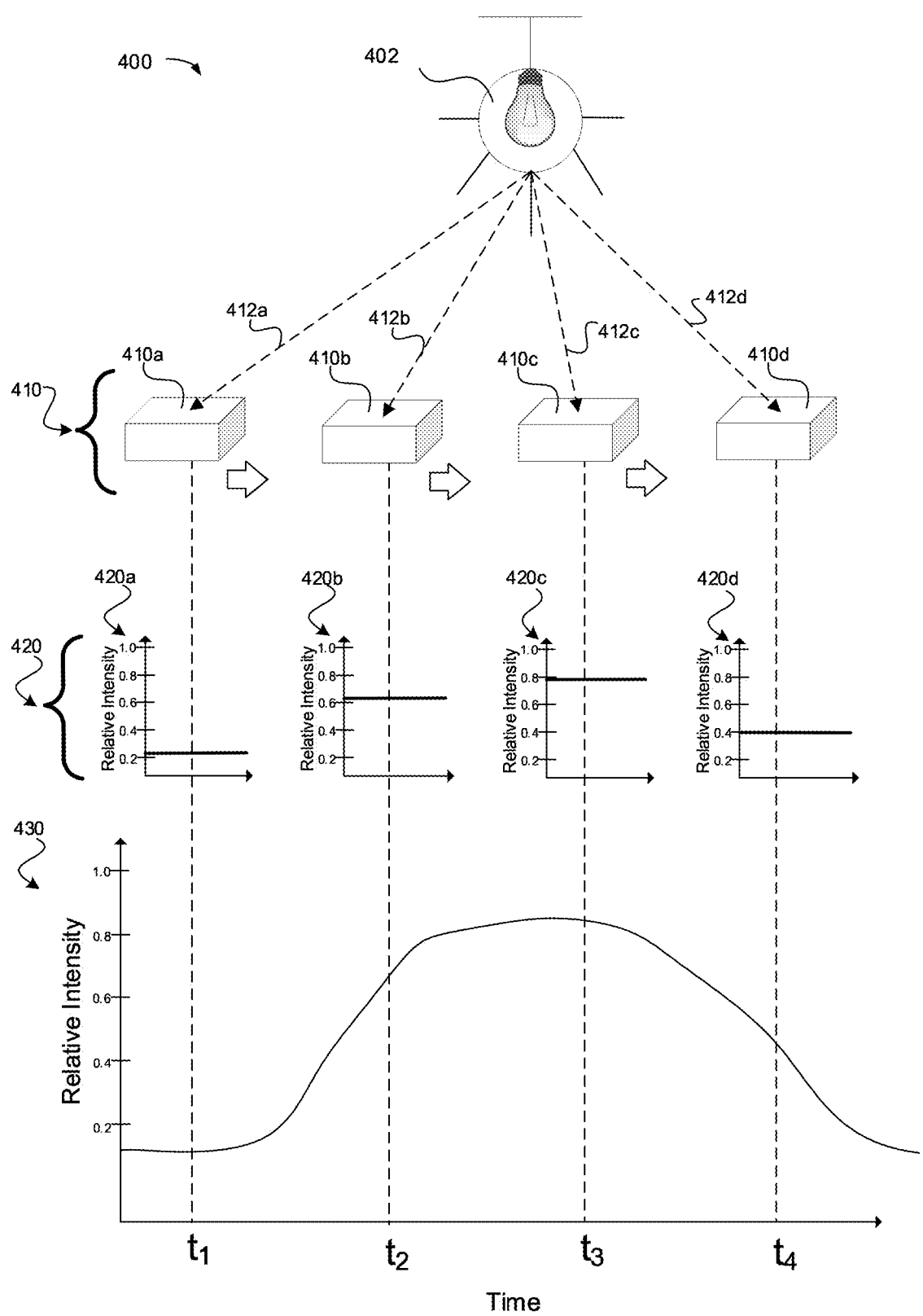
FIG. 4 is a block diagram illustrating an example timing diagram of an ambient light sensor relative to a light source in accordance with some implementations.

FIG. 4 is a block diagram illustrating an example timing diagram 400 of an ambient light sensor relative to a light source in accordance with some implementations. In particular, timing diagram 400 is an example ambient light sensor 410 that is moving (e.g., moving because a mobile device that includes the ALS 410 is moving) in a room with respect to a light source 420 at four example time stamps (e.g., $t_1$, $t_2$, $t_3$, and $t_4$). In particular, for example, at time $t_1$, ALS 410a is at a distance 412a from the light source 402 which provides a relative intensity of approximately 0.2 on the scale 420a. At time $t_2$, ALS 410b is closer to the light source 402 at a distance 412b, which provides a higher relative intensity of approximately 0.4 on the scale 420b. At time $t_3$, ALS 410c is the closest to the light source 402 at a distance 412c, which provides a higher relative intensity of approximately 0.8 on the scale 420c. Then, at time $t_4$, ALS 410d is moving away from the light source 402 at a distance 412d, which provides a lower relative intensity of approximately 0.4 on the scale 420c. The overall relative intensity is illustrated at graph 430.

In some implementations, in order to estimate the locally high illuminance values, a Gaussian process regression technique may be used. This regression technique places a Gaussian along the estimated direction every time an illuminance measurement is obtained. The Gaussian at the measurement location would have a small variance that is estimated from the ALS characteristics. Based on the measurements obtained, a regression is carried out to estimate the illuminance values at all other orientations where measurements have not been obtained, albeit, with higher variance (e.g., uncertainty). Every time a new measurement is obtained, the regression can be updated to keep a running estimation for the location of the light source(s). In some implementations, this approach can also create a user interface with guiding elements (e.g., augmented reality images) to guide the user to collect information from regions that have no measurements of the light source(s) from the ALS. For example, in the case of an XR experience, a guiding element algorithm could generate guiding elements to inform the user to tilt their head in a certain way (e.g., a model of a person's head tilting, a directional arrow, an audio feedback message, or the like, or any combination) that would allow for obtaining illuminance readings along a direction that has not yet been explored.

Figure 5A:
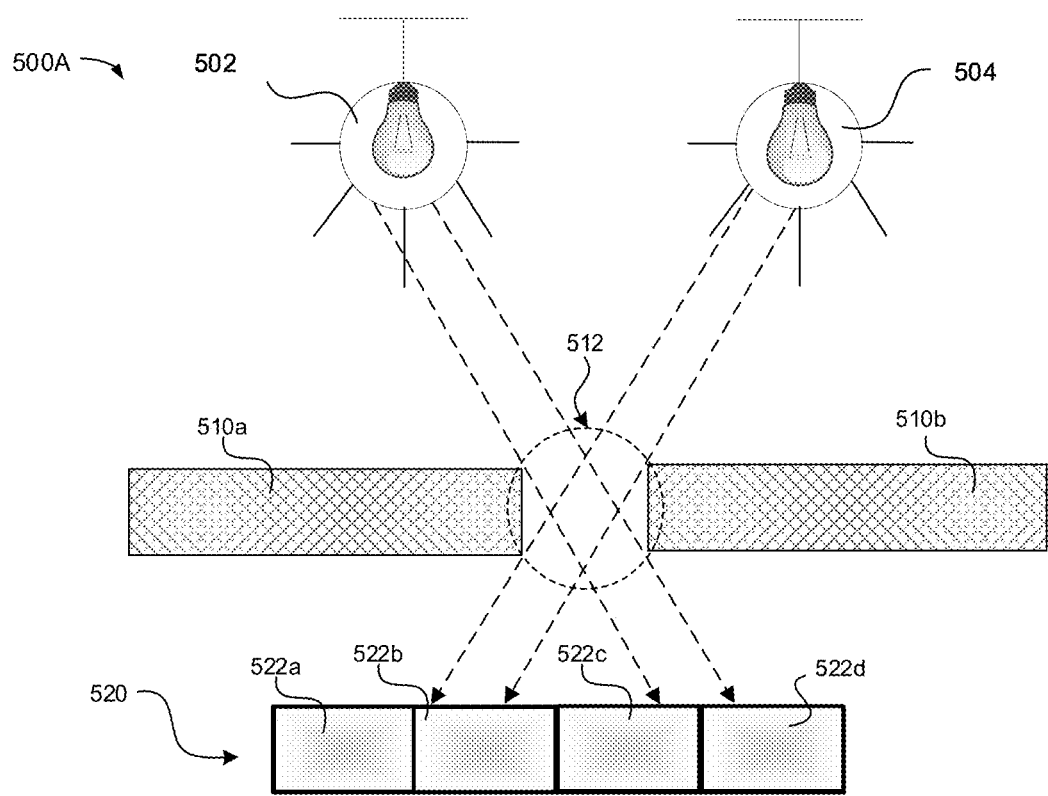
FIGS. 5A-5B are block diagrams illustrating example ambient light sensors relative to two light sources in accordance with some implementations.
Figure 5B:
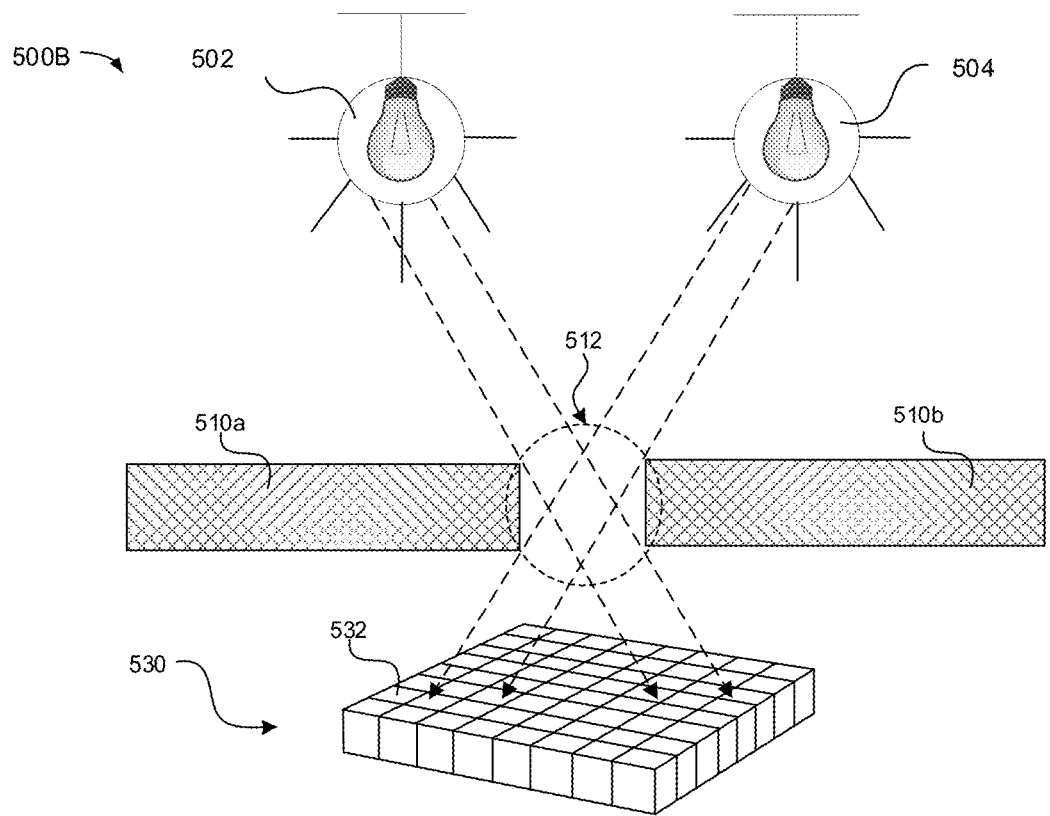

FIGS. 5A-5B are block diagrams illustrating example ambient light sensors relative to two light sources in accordance with some implementations. In particular, FIG. 5A illustrates an example environment 500A that includes light sources 502 and 504 that produce light towards an ALS screen 510a, 510b (e.g., a mobile device casing, an ALS screen, or the like), that creates a pinhole at the region 512. Additionally, the example environment 500A includes an ALS 520 with four sensing elements 522a-522d. The pinhole at region 512 limits the light produced by each light source 502 and 504, where the illuminance values measured at each sensing element 522 can allow a system to better determine the location of each light source. FIG. 5B illustrates an example environment 500B that also includes light sources 502 and 504 that produce light towards an ALS screen 510a, 510b, that creates a pinhole at the region 512. However, the example environment 500B includes an ALS 530 with a grid (e.g., 8×8) of sensing elements 532. The pinhole at region 512 limits the light produced by each light source 502 and 504, where the illuminance values measured at each sensing element 532 can allow a system to better determine the location of each light source. The grid arrangement of ALS 530 versus a single sensing element or a row of sensing elements (e.g., ALS 520 of FIG. 5A) allows the ALS 530 to more accurately estimate the location of each light source with higher specificity.

Alternatively, in some implementations, multiple light sources may be distinguished from one another based on spectral properties, such as chrominance values. For example, colors, such as CIE-XYZ, or even a more fine-grained multispectral sensing, allow to distinguish the spectral properties of each light source. In some implementations, the electromagnetic spectrum is measured with multiple filters to be able to distinguish multiple light sources. In some implementations, a light source may be infrared light, which is electromagnetic radiation with wavelengths longer than those of visible light. Each light source may provide unique spectral properties such as amplitude, wavelength, and frequency that can be measured and compared to distinguish between multiple light sources.

Figure 6:
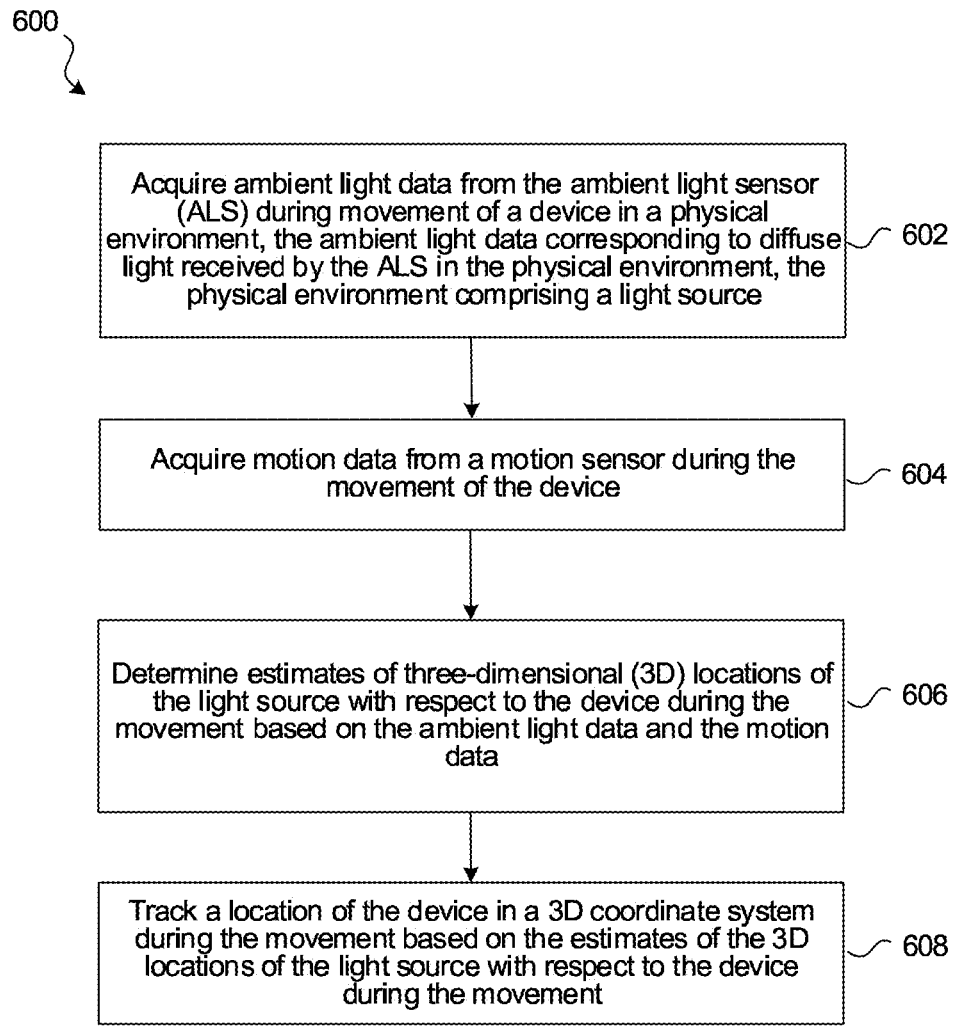
FIG. 6 is a flowchart representation of an exemplary method that tracks a location of a device based on estimating a location of a light source using ambient light data in accordance with some implementations.

FIG. 6 is a flowchart representation of an exemplary method 600 that tracks a location of a moving device in a 3D coordinate system based on estimates of the 3D locations of the light source with respect to the device in accordance with some implementations. In some implementations, the method 600 is performed by a device (e.g., server 110 or device 120 of FIGS. 1-3), such as a mobile device, desktop, laptop, or server device. The method 600 can be performed on a device (e.g., device 120 of FIGS. 1 and 3) that has a screen for displaying images and/or a screen for viewing stereoscopic images such as a head-mounted display (HMD). In some implementations, the method 600 is performed by processing logic, including hardware, firmware, software, or a combination thereof. In some implementations, the method 600 is performed by a processor executing code stored in a non-transitory computer-readable medium (e.g., a memory). The tracking process of method 600 is illustrated with reference to FIGS. 7-11.

At block 602, the method 600 acquires ambient light data from an ALS during movement of a device in a physical environment that includes at least one light source. The ambient light data corresponds to diffuse light received by the ALS in the physical environment. For example, unlike an RGB camera that provides dense pixel data about specific portions of the environment, an ALS provides one or more luminance values corresponding to diffuse light coming from a broader direction in the environment, as discussed herein with reference to FIG. 4. In some implementations, the ALS may have a single sensor. Alternatively, the ALS may have a row (e.g., 4) of sensing elements, as discussed herein with reference to FIG. 5A. Alternatively, the ALS may have a grid (e.g., 8×8) of sensing elements, as discussed herein with reference to FIG. 5B. In some implementations, the ambient light data may be directional, e.g., providing a level of ambient light in a relative direction the sensor is facing. In some implementations, the level of ambient light can be in a more discrete region, e.g., using a "pinhole" to limit the direction of the light received by sensing elements of the ALS, as discussed herein with reference to FIG. 5B.

At block 604, the method 600 acquires motion data from a motion sensor during the movement of the device. For example, the motion data may be motion trajectory data generated from an accelerometer or a gyroscope located within the device. In some implementations, the motion data may be motion trajectory data generated from an inertial measurement unit (IMU) that measures and reports a device's specific force, angular rate, and sometimes the orientation of the device, using a combination of accelerometers, gyroscopes, and/or magnetometers.

At block 606, the method 600 determines estimates of 3D locations of the light source with respect to the device during the movement based on the ambient light data and the motion data. In some implementations, the estimates of 3D locations of the light source could be probabilistic. For example, estimating the 3D location of the light source may involve generating and updating a 3D probability map. In some implementations, estimating the 3D location of the light source may involve tracking probabilistic location estimates for multiple light sources. For example, multiple light sources may be distinguished from one another based on spectral properties, such as chrominance values. For example, colors, such as CIE-XYZ, or even a more fine-grained multispectral sensing, allow to distinguish the spectral properties of each light source. In some implementations, the electromagnetic spectrum is measured with multiple filters to be able to distinguish multiple light sources. In some implementations, a light source may be infrared light, which is electromagnetic radiation with wavelengths longer than those of visible light. Each light source may provide unique spectral properties such as amplitude, wavelength, and frequency that can be measured and compared to distinguish between multiple light sources.

In some implementations, the estimates of 3D locations of the light source could be deterministic. For example, estimating the 3D location of the light source may involve determining deterministic estimates that includes iteratively updating location estimates for the light source in the physical environment at a particular frequency (e.g., every five seconds). For example, each iteration can include determining a location estimate for the light source based on the 3D location, and updating the 3D location of the location estimate for the light source in a 3D grid. In some implementations, the 3D grid includes a notification (e.g., binary, or the like) of the location estimate of the light source. In some implementations, each iteration could include updating the estimates of the position of the light source using camera images taken at the particular frequency of each iteration, or at another interval, such as once every minute. Using the camera image to verify the location of the light source may improve accuracy of the determining estimates using the ambient light data, without compromising computation budget. For example, recalibrating the location of the light source with image data once per minute, but tracking estimates for the location of the light source using ambient light data continuously.

At block 608, the method 600 tracks a location of the device in a 3D coordinate system during the movement based on the estimates of the 3D locations of the light source with respect to the device during the movement. For example, tracking location of a device can provide continuity during an XR experience while VIO tracking is used intermittently or at varying rates (e.g., frames per second (FPS)). In some implementations, for example, tracking a location of the device in a 3D coordinate system can be used to localize two devices to one another based on ALS which may be used to provide different perspectives of virtual objects in an XR experience. In some implementations, for example, tracking a location of the device in a 3D coordinate system can be used to render a virtual object using light source estimation from the ALS. For example, for two different color of lights, as a virtual object moves in an XR environment, the shadow effects may change depending on a distance from each respective light.

In some implementations, the method 600 tracks multiple light sources. For example, in some implementations, determining probabilistic estimates includes tracking probabilistic location estimates for the first light source and a second light source in the physical environment, where the tracking is based on differences in spectral properties (e.g., chrominance values, wavelength, etc.) of the first light source and the second light source.

Figure 8A:
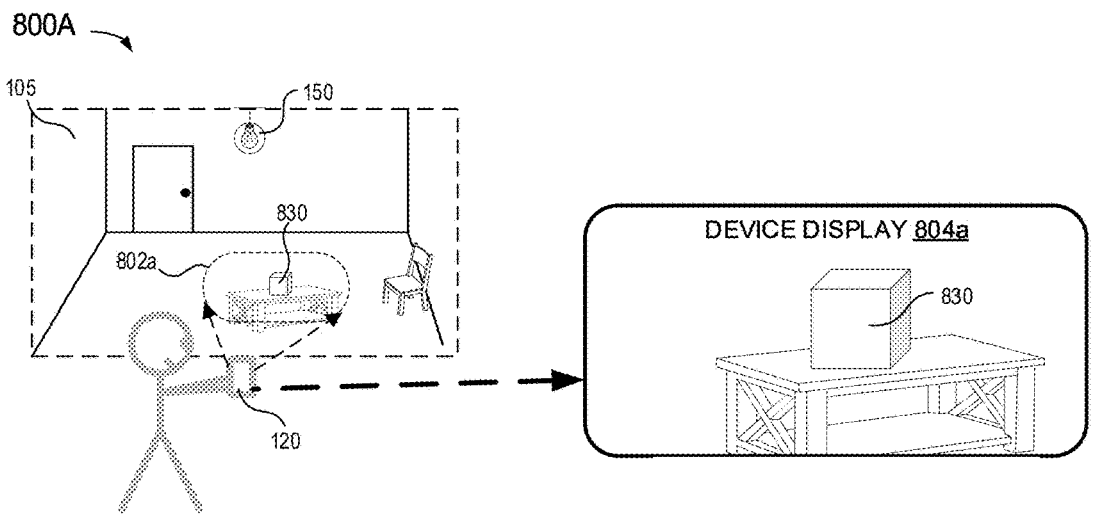
FIGS. 8A-8C are block diagrams illustrating example operating environments in accordance with some implementations.
Figure 8B:
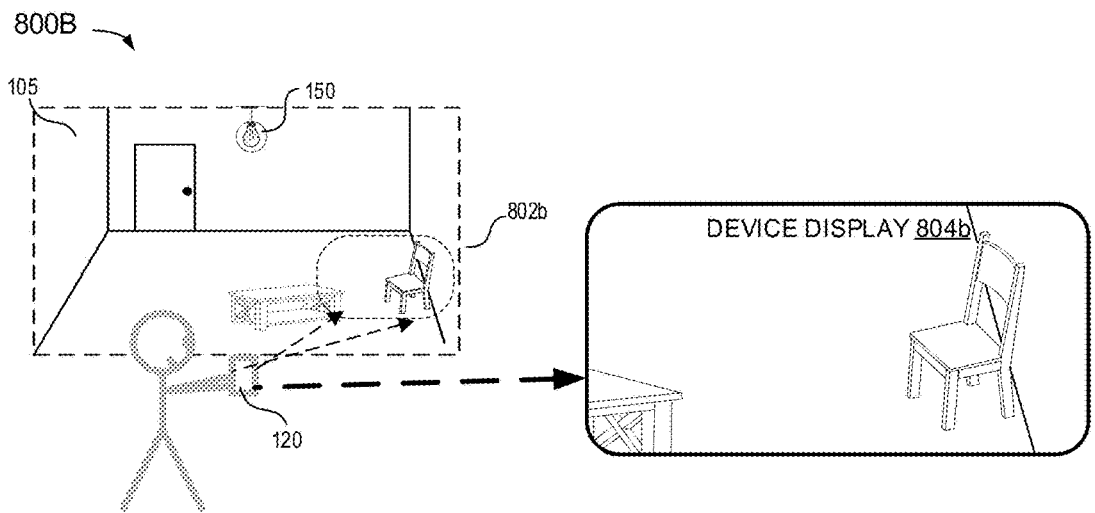
Figure 8C:
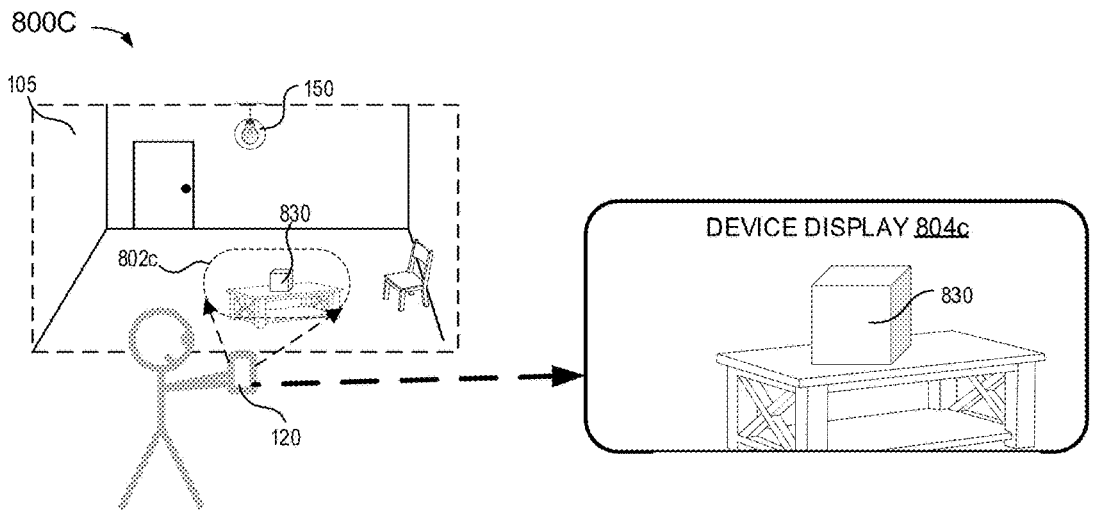

In some implementations, the method 600 provides continuity during an XR experience while VIO tracking is used intermittently or at varying rates/FPS. For example, looking at a virtual object in an XR environment, such as a virtual calendar, looking away from the virtual calendar (turning off VIO tracking), than looking back at the virtual calendar while maintaining continuity of the virtual calendar via the Ambient light data. In some implementations, the tracking provides continuity between time periods during presentation of an extended reality (XR) environment during which a second tracking technique (e.g., VIO) is altered (e.g., turned off or on low power mode) based on inclusion or exclusion of virtual content. In some implementations, the exemplary method further involves, during a first time period, tracking the device using VIO, positioning a virtual object in an XR environment based on the tracking of the device during the first time period, and presenting a first view of the XR environment including the virtual object, during a second time period after the first time period, presenting a second view of the XR environment and, based on the second view excluding the virtual object, (e.g., looking away from the virtual calendar) tracking the device using the ambient light data and altering (e.g., discontinuing or slowing down) the tracking of the device using VIO, and during a third time period after the second time period, positioning the virtual object in a third view of the XR environment (e.g., when the user looks back at the place where the virtual calendar was) based on tracking the device using the ambient light data and using VIO. Thus, when the user looks back at the calendar there is faster localization. This example is further illustrated with reference to FIGS. 8A-8C, illustrating an example of a user looking at a virtual content in one area, looking away from that area, then looking back where the virtual content was.

In some implementations, the method 600 involves localizing two devices to one another based on ambient light data which may be used to provide different perspectives of virtual objects. For example, virtual object rendering on a conference table, where every device can be localized using the ALS and a flickering device on the table (e.g. IR device on a table that flickers but is not visible to the human eye). For example, in some implementations, the device is a first device and the ambient light data is first ambient light data, the method further includes determining relative locations of the first device and a second device based on determining that the first ambient light data acquired at the first device and second ambient light data acquired at the second device correspond to the light source. In some implementations, the first device and second device provide different views of a virtual object based on the relative locations of the first device and the second device. In some implementations, the light source is a beacon producing light having a distinctive characteristic (e.g., a flickering IR device). This example is further illustrated with reference to FIGS. 9A-9B.

In some implementations, the method 600 involves rendering a virtual object using light source estimation from the ALS. For example, a virtual object moving across a viewing area in an XR environment would appear differently if there was one yellow light and one white light at different locations, there would be different color shadows, etc. For example, in some implementations, the light source is a first light source that generates a first type of lighting (e.g., yellow light), wherein the physical environment further includes a second light source that generates a second type of lighting (e.g., white light) that is different than the first type of lighting, the method further including providing, at the device, an XR environment that includes a virtual object within a view of the physical environment. In some implementations, the method further includes determining probabilistic estimates of 3D locations of the first light source and the second light source during movement of the virtual object from a first location to a second location, wherein a first location of the virtual object is closer to the first light source than the second light source, and a second location of the virtual object is closer to the second light source than the first light source. In some implementations, the method further includes determining, at the first location of the virtual object, a first light source estimation effect of the first light source and the second light source based on the location of the virtual object with respect to the first light source and the second light source and based on the first type of lighting generated by the first light source and the second type of lighting generated by the second light source, providing, based on the first light source estimation effect, the virtual object at the first location, determining, at the second location of the virtual object, a second light source estimation effect of the first light source and the second light source based on the location of the virtual object with respect to the first light source and the second light source and based on the first type of lighting generated by the first light source and the second type of lighting generated by the second light source, and providing, based on the second light source estimation effect, the virtual object at the second location. This example is further illustrated with reference to FIG. 10.

In some implementations, the method 600 further includes acquiring image data (e.g., RGB data or the like) of the physical environment captured via a camera on the device, determining, based on the image data, the 3D location of the light source with respect to the device, and updating (e.g., calibrating) the estimated 3D location of the light source that is based on the ambient light data and the motion data based on the determined 3D location of the light source from the image data. In some implementations, the image data is acquired at a frequency that is lower (e.g., once per minute) than a frequency the ambient light data and the motion data is acquired (e.g., once per second). For example, image data may be acquired to recalibrate and update the estimated location of the light source as determined by the ambient light data and motion data. The updated estimation of the light source improves the accuracy of the location estimation without compromising on computation budget. For example, computations for determining a location of a light source via image data requires more computations and processing power than the ambient light data computations. Thus, utilizing the image data less frequently for light source location determination (e.g., higher computation power and higher accuracy) and more frequently using ambient light data for light source location estimation (e.g., lower computation power and less accurate than using image data) improves overall processing efficiency.

In use, for the process 600, a user may scan a room with a device (e.g., a smartphone such as device 120) and the processes described herein would capture sensor data (e.g., ambient light sensor data, motion data, image data such as light intensity data and depth data, camera position information, etc.), assess the sensor data with respect to light sources, and track a location of the device in a 3D coordinate system based on estimates of the 3D locations of the light source with respect to the device as it moves in the physical environment. In some implementations, the process 600 could provide a 3D representation for the physical environment (e.g. physical environment 105), or a particular portion of the physical environment such as an object (e.g., object 130), as it is being scanned by the user. In some implementations, the 3D representation may be automatically displayed and updated on the user device overlaid during a live camera feed. In some implementations, the 3D representation may be provided after some type of user interaction after scanning the physical environment because additional ambient light data may be required for sufficient localization. For example, the user may be shown some type of augmented reality image overlaid on the live camera feed that guides the user to where to acquire the additional data. Thus, as shown and discussed below with reference to FIGS. 7-11, an ALS tracking unit (e.g., ALS tracking unit 242 of FIG. 2, and/or ALS tracking unit 342 of FIG. 3) determines ALS tracking data associated with a location of a moving device in a 3D coordinate system based on determined estimates of 3D locations of the light source with respect to the device. The ALS tracking data is then utilized by a 3D representation unit (e.g., 3D representation unit 244 of FIGS. 2, and/or 3D representation unit 344 of FIG. 3), in conjunction with image data and camera positioning information, to generate 3D representation data for a portion of (e.g., an object) or all of the scanned physical environment, as part of an XR experience.

Figure 7:
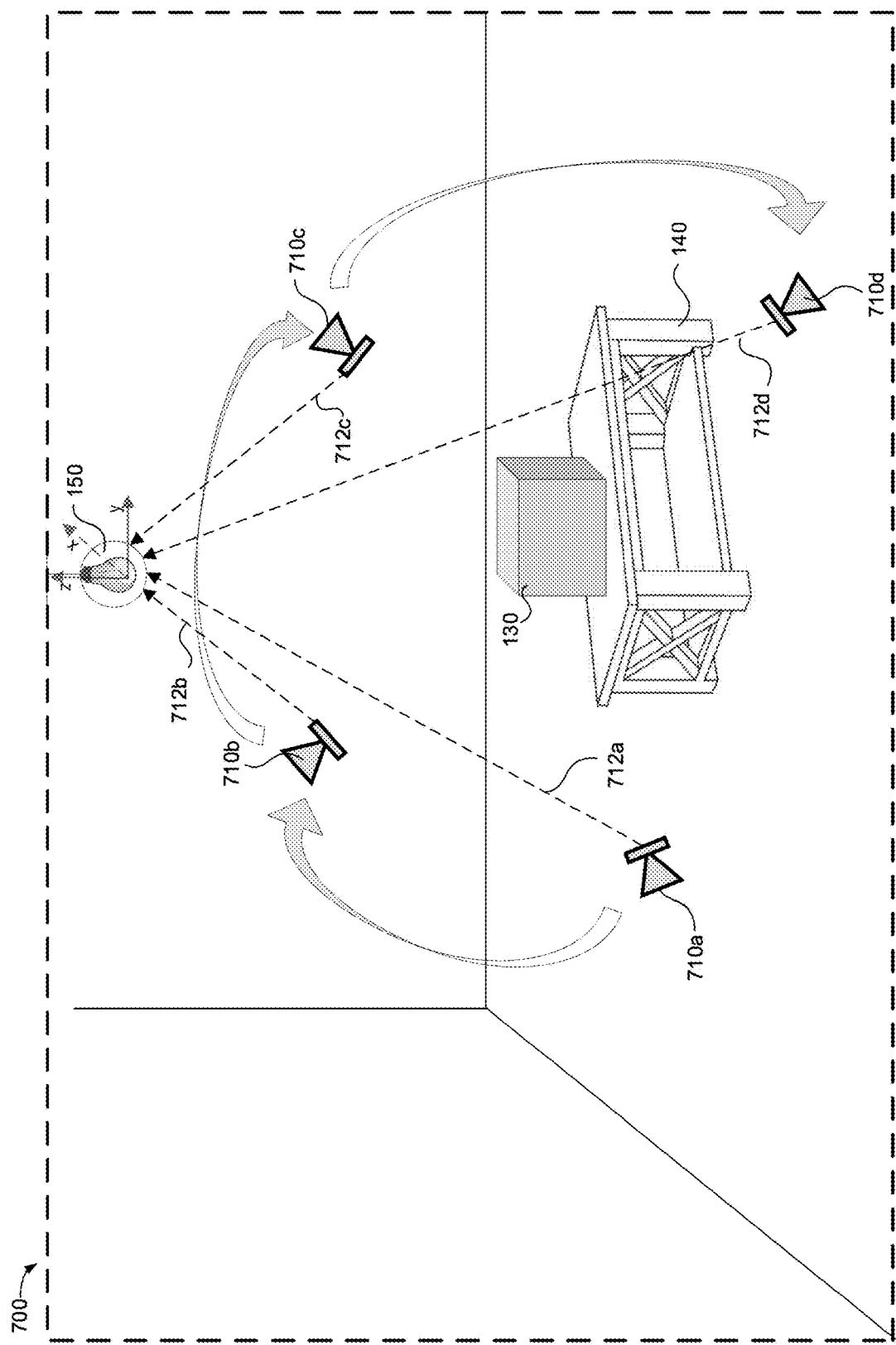
FIG. 7 is a block diagram illustrating example fields of view of an ambient light sensor with respect to a light source in a physical environment in accordance with some implementations.

FIG. 7 is a block diagram of an example operating environment 700 illustrating example estimations of a location of a light source (e.g., light source 150) from an ALS (e.g., I/O devices(s) & sensor(s) 304 of the device 120) in a physical environment in accordance with some implementations. In this example, the example operating environment 700 illustrates an environment that includes an ALS 710, an object 130, and a table 140 from the physical environment 105 of FIG. 1. The ALS 710 is shown at four different locations (e.g., the ALS 710 is within a device that is moving around the room): ALS 710a, with an estimated distance 712a to light source 150, ALS 710b, with an estimated distance 712b to light source 150, ALS 710c, with an estimated distance 712c to light source 150, and ALS 710d, with an estimated distance 712d to light source 150. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 700 includes an ALS 710. In some implementations, the ALS 710 may include one or more sensing elements.

As shown in FIG. 7, the ALS 710 is angled towards the object 130 as the user may be scanning the object for possibly creating a 3D representation of the object 130 for an XR experience. As discussed herein, determining estimates of 3D locations of the light source 150 can be determined with respect to the device during the movement of the device based on ambient light data from ALS 710 as the ALS 710 is moved around the physical environment. In some implementations, estimating the 3D location of the light source may involve generating and updating a 3D probability map. In some implementations, estimating the 3D location of the light source may involve tracking probabilistic location estimates for multiple light sources. For example, multiple light sources may be distinguished from one another based on spectral properties, such as chrominance values. For example, colors, such as CIE-XYZ, or even a more fine-grained multispectral sensing, allow to distinguish the spectral properties of each light source. In some implementations, the electromagnetic spectrum is measured with multiple filters to be able to distinguish multiple light sources. In some implementations, a light source may be infrared light, which is electromagnetic radiation with wavelengths longer than those of visible light. Each light source may provide unique spectral properties such as amplitude, wavelength, and frequency that can be measured and compared to distinguish between multiple light sources. As illustrated, a user is acquiring sensor data around the object 130 at different locations (e.g., different camera views).

FIGS. 8A-8C are block diagrams illustrating example operating environments with different fields of view of a device in an XR experience in accordance with some implementations. FIGS. 8A-8C illustrate an example implementation discussed herein during an XR experience regarding looking at a virtual object, looking away from the object, then looking back at the virtual object. For example, FIGS. 8A-8C illustrate an example implementation for a process that provides continuity during an XR experience while VIO tracking is used intermittently or at varying rates/FPS. For example, looking at a virtual object in an XR environment, such as a virtual calendar, looking away from the virtual calendar (turning off VIO tracking), than looking back at the virtual calendar while maintaining continuity of the virtual calendar via the Ambient light data. In some implementations, the tracking provides continuity between time periods during presentation of an extended reality (XR) environment during which a second tracking technique (e.g., VIO) is altered (e.g., turned off or on low power mode) based on inclusion or exclusion of virtual content. In some implementations, the exemplary method further involves, during a first time period, tracking the device using VIO, positioning a virtual object in an XR environment based on the tracking of the device during the first time period, and presenting a first view of the XR environment including the virtual object, during a second time period after the first time period, presenting a second view of the XR environment and, based on the second view excluding the virtual object, (e.g., looking away from the virtual calendar) tracking the device using the ambient light data and altering (e.g., discontinuing or slowing down) the tracking of the device using VIO, and during a third time period after the second time period, positioning the virtual object in a third view of the XR environment (e.g., when the user looks back at the place where the virtual calendar was) based on tracking the device using the ambient light data and using VIO. Thus, when the user looks back at the calendar there is faster localization.

In particular, FIG. 8A is a block diagram of an example environment 800A of a physical environment 105 that includes a light source 150. The example environment 800A also includes a virtual object 830, and a device 120 that user is using to acquire sensor data. The particular view of the device 120 for example environment 800A is viewing area 802a, as shown on the device display 804a (e.g., display 312 of FIG. 3). For example, the device display 804a is displaying a live view of the viewing area 802a. In this example environment, virtual content (e.g., virtual object 830), has been created as part of an XR experience. As the user is displaying viewing area 802a that includes virtual content, VIO tracking may be used at a normal rate (e.g., normal power mode) to ensure proper viewing of the virtual content while in a viewing area of the user. FIG. 8B is a block diagram of an example environment 800B this is similar to example environment 800A except now the user has moved to a different viewing area that does not require virtual content to be generated in the viewing area. For example, the particular view of the device 120 for example environment 800B is viewing area 802b, as shown on the device display 804b. In this example environment 800B, virtual content (e.g., virtual object 830), is outside of the view of the current XR experience for the user. As the user is displaying viewing area 802b that does not include virtual content, VIO tracking may be turned off or used at an altered rate (e.g., turned off or on low power mode), and the ambient light data is used to track the device. FIG. 8C is a block diagram of an example environment 800C this is similar to example environments 800A and 800B, except now the user has moved back to a viewing area 802c that is similar to viewing are 802a that includes the virtual content (e.g., virtual object 830). For example, the particular view of the device 120 for example environment 800C is viewing area 802c, as shown on the device display 804c. In this example environment 800C, virtual content (e.g., virtual object 830), is inside of the view of the current XR experience for the user. As the user is displaying viewing area 802c that includes virtual content, VIO tracking may be turned back on to track the device to provide optimal localization while viewing the virtual content during the XR experience.

Figure 9A:
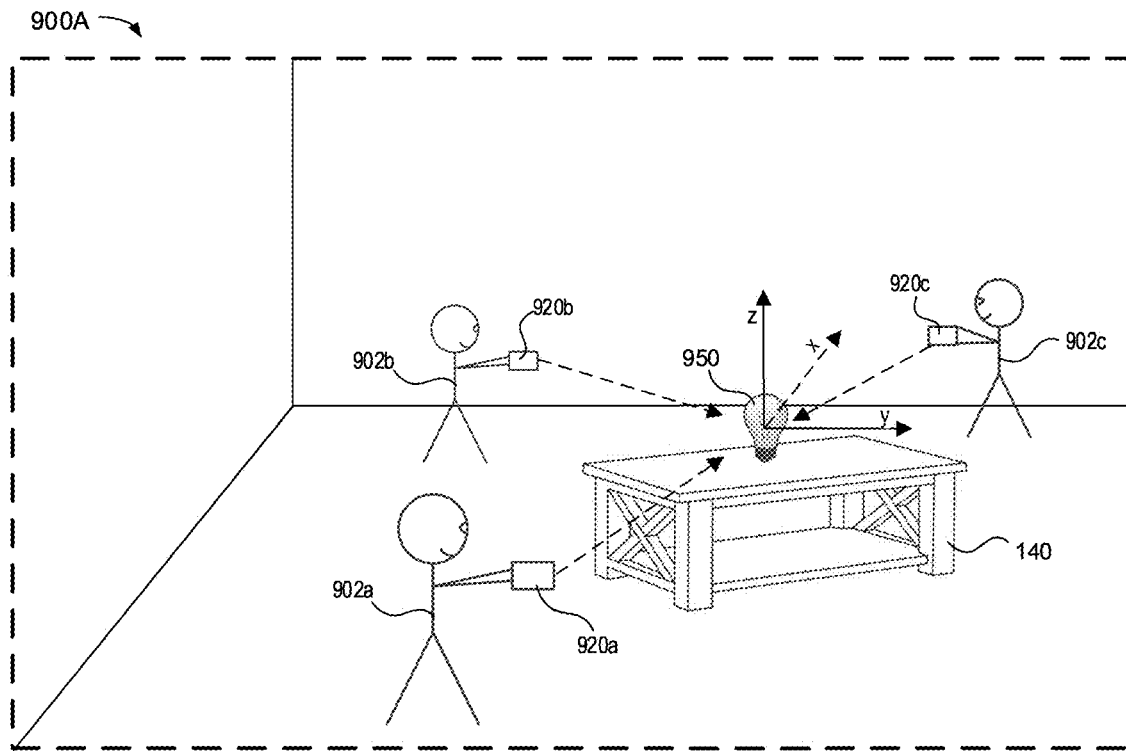
FIGS. 9A-9B are block diagrams illustrating example operating environments in accordance with some implementations.
Figure 9B:
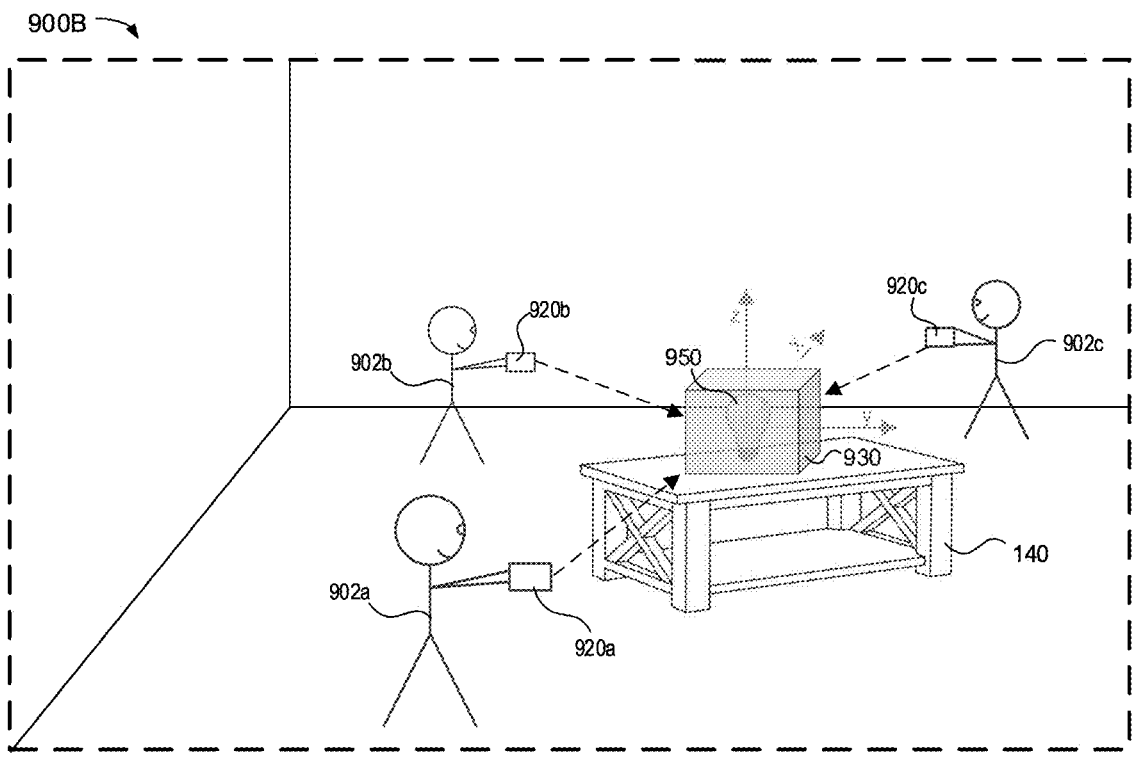

FIGS. 9A-9B are block diagrams illustrating example operating environments in accordance with some implementations. FIGS. 9A-9B illustrate an example implementation discussed herein during an XR experience regarding localizing two or more devices to one another based on ambient light data which may be used to provide different perspectives of virtual objects. For example, virtual object rendering on a conference table, where every device can be localized using the ALS and a flickering device on the table (e.g. IR device on a table that flickers but is not visible to the human eye). For example, in some implementations, the device is a first device and the ambient light data is first ambient light data, the method further including determining relative locations of the first device and a second device based on determining that the first ambient light data acquired at the first device and second ambient light data acquired at the second device correspond to the light source. In some implementations, the first device and second device provide different views of a virtual object based on the relative locations of the first device and the second device. In some implementations, the light source is a beacon producing light having a distinctive characteristic (e.g., a flickering IR device).

In particular, FIG. 9A is a block diagram of an example environment 900A of a physical environment (e.g., physical environment 105) that includes a light source 950 on a table 140. In this example, the light source 950 is a beacon producing light having a distinctive characteristic (e.g., a flickering IR device). Example environment 900A illustrates three users 902a, 902b, and 902c, each with a device 920a, 920b, 920c, respectively, pointed at the light source 950. Each device 920 (e.g., device 120 of FIGS. 1 and 3) includes an ALS that is able to detect the flickering IR from the light source 950, and use the light source 950 to localize each device to each other using methods described herein. FIG. 9B is a block diagram of an example environment 900B that illustrates a time period after each device is localized with respect one another utilizing the ambient light data from light source 950 as illustrated in FIG. 9A. Example environment 900B illustrates virtual content 930 that is generated by a 3D representation unit at each respective device 920 and viewed by a display each respective device 920 from their respective viewing angles. For example, if the virtual content was a virtual statue of a dog facing towards user 902a (e.g., facing towards the front of the room), user 902a may be able to see in the display area of device 920a the front of the statue, while user 902b and 902c would each view a different perspective from behind the statue on their respective displays. By utilizing the light source 950 for localization, each respective 3D representation unit at each respective device 920a-920c could generate virtual content at the light source 950 as a beacon or an anchor point for the 3D coordinates for the virtual content. Thus, if the users walk around the virtual content, their respective views would change, but the virtual content would appear as anchored in a fixed position.

Figure 10:
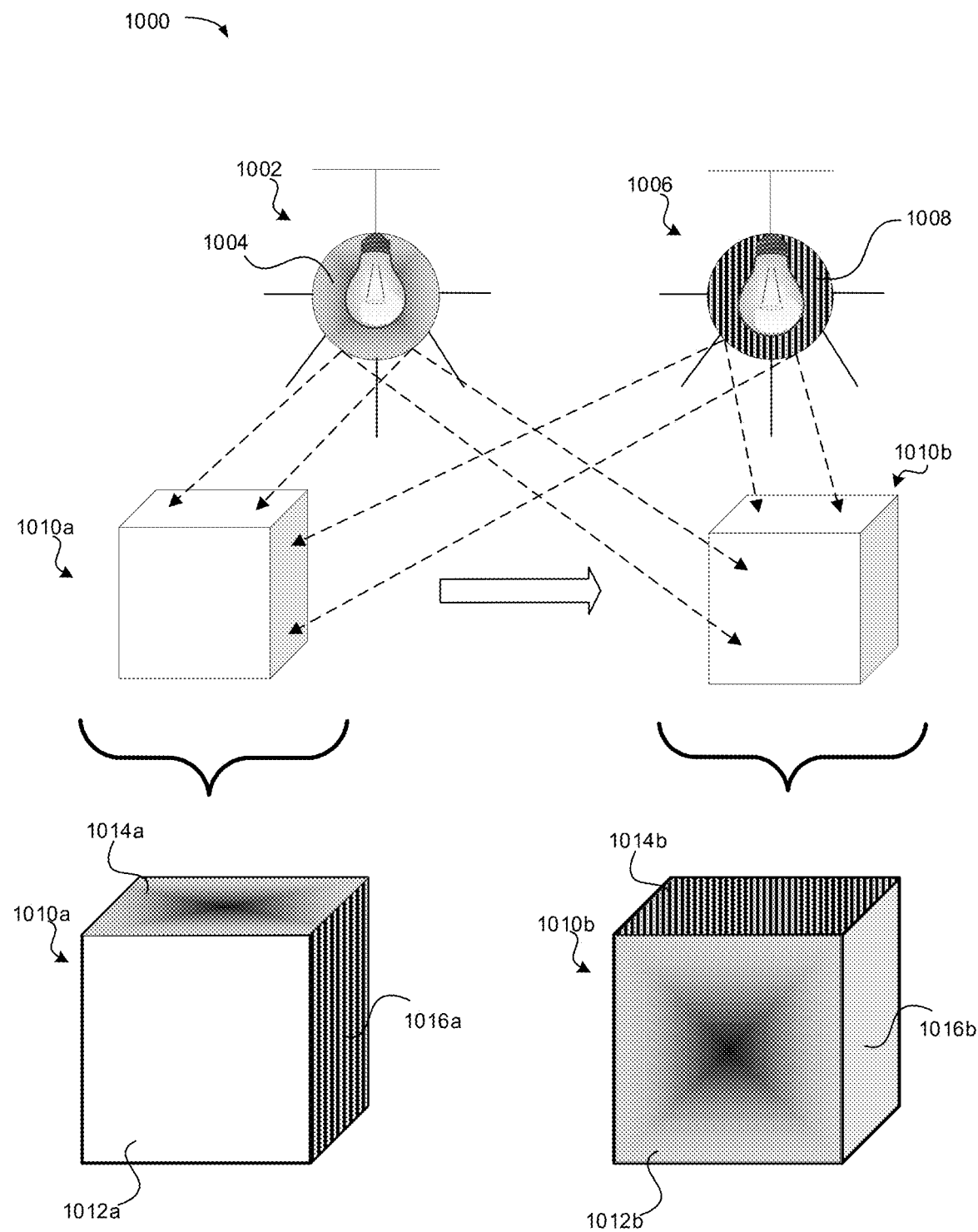
FIG. 10 is a block diagram illustrating an example virtual object relative to two light sources in accordance with some implementations.

FIG. 10 is a block diagram illustrating an example virtual object moving relative to two light sources in accordance with some implementations. FIG. 10 illustrates an example implementation discussed herein during an XR experience regarding a virtual object moving across a viewing area in an XR environment would appear differently if there was one yellow light and one white light at different locations, there would be different color shadows, etc. For example, in some implementations, the light source is a first light source that generates a first type of lighting (e.g., yellow light), wherein the physical environment further includes a second light source that generates a second type of lighting (e.g., white light) that is different than the first type of lighting, the method further including providing, at the device, an extended reality (XR) environment that includes a virtual object within a view of the physical environment. In some implementations, the method further includes determining probabilistic estimates of 3D locations of the first light source and the second light source during movement of the virtual object from a first location to a second location, wherein a first location of the virtual object is closer to the first light source than the second light source, and a second location of the virtual object is closer to the second light source than the first light source. In some implementations, the method further includes determining, at the first location of the virtual object, a first light source estimation effect of the first light source and the second light source based on the location of the virtual object with respect to the first light source and the second light source and based on the first type of lighting generated by the first light source and the second type of lighting generated by the second light source, providing, based on the first light source estimation effect, the virtual object at the first location, determining, at the second location of the virtual object, a second light source estimation effect of the first light source and the second light source based on the location of the virtual object with respect to the first light source and the second light source and based on the first type of lighting generated by the first light source and the second type of lighting generated by the second light source, and providing, based on the second light source estimation effect, the virtual object at the second location.

In particular, FIG. 10 is a block diagram of an example environment 1000 that includes a first light source 1002 that radiates a distinct light characteristic 1004 (e.g., a yellow light) and a second light source 1006 that radiates a distinct light characteristic 1008 (e.g., a white light). For illustration purposes, distinct light characteristic 1004 is shown as dots, and distinct light characteristic 1008 is shown as a checkered pattern. Example environment 1000 includes a virtual object 1010 and is shown at two different time periods, virtual object 1010a at the first time period, and virtual object 1010b at the second time period. The distinct light characteristics 1004 and 1008 will reflect differently onto the virtual object 1010 depending on distance from the virtual object to each respective light source 1002, 1006, based on ambient light data using processes described herein. Thus, the ALS tracking data sent to a 3D representation unit, and include these distinctions of distances to reach respective light sources 1002, 1006, and thus create virtual content and the shadow effects from each distinct light characteristic 1004, 1008, depending on the distances to each light source 1002, 1006, respectively. For example, virtual object 1010a is shown on the top face 1014a with having more of the distinct light characteristic 1004 (e.g., yellow light reflection or yellow light shading effects) since the top face of virtual object 1010a is closer to the light source 1002, and virtual object 1010b is shown on the top face 1014b with having more of the distinct light characteristic 1008 (e.g., white light reflection or white light shading effects) since the top face of virtual object 1010b is closer to the light source 1006. Similarly, the right facing surface 1016a of the virtual object 1010a is facing the light source 1006 more than light source 1002, thus is shown with distinct light characteristic 1008, and the front facing surface 1012b of the virtual object 1010b is facing the light source 1002 more than light source 1006, thus is shown with distinct light characteristic 1004.

In some implementations, multiple light sources (e.g., light source 1002, light source 1006) may be distinguished from one another based on spectral properties, such as chrominance values. For example, colors, such as CIE-XYZ, or even a more fine-grained multispectral sensing, allow to distinguish the spectral properties of each light source. In some implementations, the electromagnetic spectrum is measured with multiple filters to be able to distinguish multiple light sources. In some implementations, a light source may be infrared light, which is electromagnetic radiation with wavelengths longer than those of visible light. Each light source may provide unique spectral properties such as amplitude, wavelength, and frequency that can be measured and compared to distinguish between multiple light sources.

Figure 11:
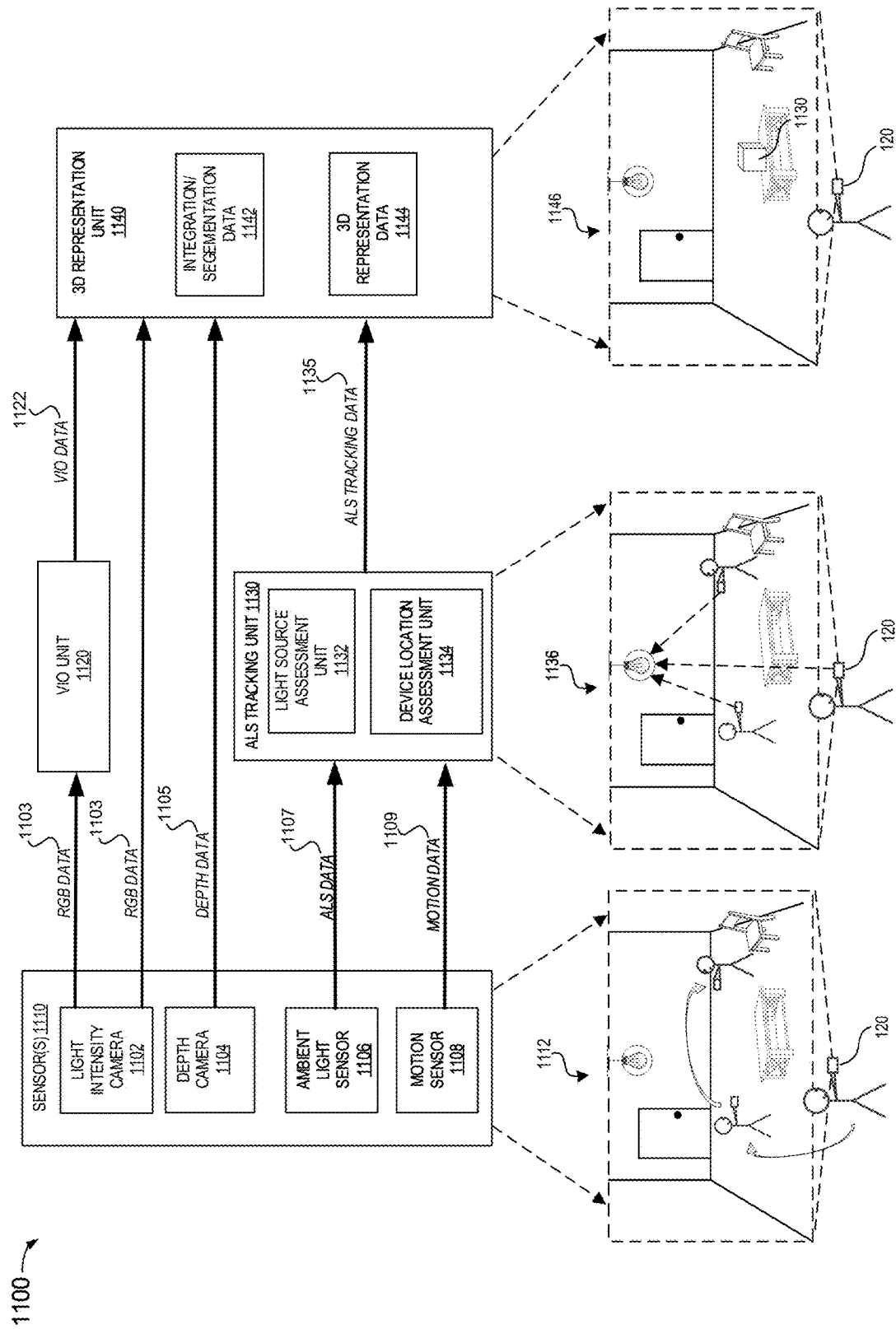
FIG. 11 is a system flow diagram of an example generation of three-dimensional (3D) data based on tracking a location of a device based on estimating a location of a light source using ambient light data according to some implementations.

FIG. 11 is a system flow diagram of an example environment 1100 tracks a location of a moving device in a 3D coordinate system based on estimates of the 3D locations of the light source with respect to the device in accordance with some implementations, and generates 3D representation data for at least a portion of the physical environment using the ALS tracking data. In some implementations, the system flow of the example environment 1100 is performed on a device (e.g., server 110 or device 120 of FIGS. 1-3), such as a mobile device, desktop, laptop, or server device. The system flow of the example environment 1100 can be displayed on a device (e.g., device 120 of FIGS. 1 and 3) that has a screen for displaying images and/or a screen for viewing stereoscopic images such as a head-mounted display (HMD). In some implementations, the system flow of the example environment 1100 is performed on processing logic, including hardware, firmware, software, or a combination thereof. In some implementations, the system flow of the example environment 1100 is performed on a processor executing code stored in a non-transitory computer-readable medium (e.g., a memory).

The system flow of the example environment 1100 acquires, utilizing a plurality of sensor(s) 1110, light intensity image data 1103 (e.g., live camera feed such as RGB from light intensity camera 1102), depth image data 1105 (e.g., depth image data such as RGB-D from depth camera 1104), ambient light data 1107 (e.g., illuminance values from ambient light sensor(s) 1106), motion data 1109 (e.g., motion trajectory data from motion sensor(s) 1108) of a physical environment (e.g., the physical environment 105 of FIG. 1), acquires positioning information (e.g., VIO unit 1120 determines VIO data based on the light intensity image data 1103), assesses the ambient light data and motion data to determine ALS tracking data for the device with respect to light source(s) (e.g., the ALS tracking unit 1130), and generates 3D representation data 1142 from the acquired sensor data (e.g., the 3D representation unit 1140). In some implementations, other sources of physical environment information is acquired (e.g., camera positioning information such as position and orientation data from position sensors) as opposed to using a VIO system (e.g., VIO unit 1120).

In an example implementation, the environment 1100 includes an image composition pipeline that acquires or obtains data (e.g., image data from image source(s), ambient light data, motion data, etc.) for the physical environment. Example environment 1100 is an example of acquiring image sensor data (e.g., light intensity data, depth data, ambient light data, and motion data) for a plurality of image frames. For example, as illustrated in example environment 1112, a user is walking around a room acquiring sensor from sensor(s) 1110. The image source(s) may include a light intensity camera 1102 (e.g., RGB camera) that acquires light intensity image data 1103 (e.g., a sequence of RGB image frames), a depth camera 1104 that acquires depth data 1105, an ambient light sensor 1106 that acquires ambient light data 1107, and a motion sensor that acquires motion data 1109.

For positioning information, some implementations include a VIO system (e.g., VIO unit 112) to determine equivalent odometry information (e.g., VIO data 1122) using sequential camera images (e.g., light intensity data 1103) to estimate the distance traveled. Alternatively, some implementations of the present disclosure may include a simultaneous localization and mapping (SLAM) system (e.g., position sensors within the sensors 1110). The SLAM system may include a multidimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

In an example implementation, the environment 1100 includes an ALS tracking unit 1130 that is configured with instructions executable by a processor to obtain sensor data (e.g., ambient light data 1107 such as light intensity data and motion data 1109 such as motion trajectory data) and determines tracking information (e.g., ALS tracking data 1135) for the device with respect to a light source using one or more of the techniques disclosed herein. For example, as illustrated in example environment 1136, as a user is walking around a room acquiring sensor from sensor(s) 1110, ALS tracking unit is determining information based on the light source and the location of the device.

In some implementations, ALS tracking unit 1130 includes a light source assessment unit 1132 that is configured with instructions executable by a processor to determine estimates of 3D locations of a light source with respect to the device during the movement of the device based on the ambient light data 1107 and the motion data 1109. For example, the light source assessment unit 1132 of the ALS tracking unit 1130 (e.g., ALS tracking unit 242 of FIG. 2 and/or ALS tracking unit 342 of FIG. 3) analyzes ambient light data from the ALS 1106 and motion data 1109 from the motion sensor(s) 1108 to determine estimates for a location for each light source that is detected. In some implementations, estimating the 3D location of the light source may involve generating and updating a 3D probability map. In some implementations, estimating the 3D location of the light source may involve tracking probabilistic location estimates for multiple light sources. For example, multiple light sources may be distinguished from one another based on spectral properties, such as chrominance values detected by the ALS 1106 and analyzed by the ALS tracking unit 1130. In some implementations, a light source may be infrared radiation (IR), sometimes called infrared light, which is electromagnetic radiation with wavelengths longer than those of visible light. Each light source may provide unique spectral properties such as chrominance values, amplitude, wavelength, and frequency that can be measured and compared to distinguish between multiple light sources.

In some implementations, ALS tracking unit 1130 includes a device location assessment unit 1134 that is configured with instructions executable by a processor to tracks a location of the device in a 3D coordinate system during the movement based on the estimates of the 3D locations of the light source with respect to the device during the movement. For example, the light source assessment unit 1132 of the ALS tracking unit 1130 (e.g., ALS tracking unit 242 of FIG. 2 and/or ALS tracking unit 342 of FIG. 3) analyzes ambient light data from the ALS 1106 and motion data 1109 from the motion sensor(s) 1108 to determine estimates for a location for each light source that is detected. Tracking location of a device can provide continuity during an XR experience while VIO tracking is used intermittently or at varying rates (e.g., frames per second (FPS)). In some implementations, for example, tracking a location of the device in a 3D coordinate system can be used to localize two devices to one another based on ALS which may be used to provide different perspectives of virtual objects in an XR experience. In some implementations, for example, tracking a location of the device in a 3D coordinate system can be used to render a virtual object using light source estimation from the ALS. For example, for two different color of lights, as a virtual object moves in an XR environment, the shadow effects may change depending on a distance from each respective light.

Additionally, or alternatively, in some implementations, the ALS tracking unit 1130 tracks multiple light sources. For example, in some implementations, determining probabilistic estimates by the light source assessment unit 1132 includes tracking probabilistic location estimates for the first light source and a second light source in the physical environment, where the tracking is based on differences in spectral properties (e.g., chrominance values, wavelength, etc.) of the first light source and the second light source.

Additionally, or alternatively, in some implementations, the ALS tracking unit 1130 provides continuity during an XR experience while VIO tracking is used intermittently or at varying rates/FPS. For example, looking at a virtual object in an XR environment, such as a virtual calendar, looking away from the virtual calendar (turning off VIO tracking), than looking back at the virtual calendar while maintaining continuity of the virtual calendar via the ambient light data. In some implementations, the tracking provides continuity between time periods during presentation of an XR environment during which a second tracking technique (e.g., VIO) is altered (e.g., turned off or on low power mode) based on inclusion or exclusion of virtual content. In some implementations, the exemplary method further involves, during a first time period, tracking the device using VIO, positioning a virtual object in an XR environment based on the tracking of the device during the first time period, and presenting a first view of the XR environment including the virtual object, during a second time period after the first time period, presenting a second view of the XR environment and, based on the second view excluding the virtual object, (e.g., looking away from the virtual calendar) tracking the device using the ambient light data and altering (e.g., discontinuing or slowing down) the tracking of the device using VIO, and during a third time period after the second time period, positioning the virtual object in a third view of the XR environment (e.g., when the user looks back at the place where the virtual calendar was) based on tracking the device using the ambient light data and using VIO. Thus, when the user looks back at the calendar there is faster localization. This example is further illustrated with reference to FIGS. 8A-8C, illustrating an example of a user looking at a virtual content in one area, looking away from that area, then looking back where the virtual content was.

Additionally, or alternatively, in some implementations, the ALS tracking unit 1130 involves localizing two devices to one another based on ambient light data which may be used to provide different perspectives of virtual objects. For example, virtual object rendering on a conference table, where every device can be localized using the ALS and a flickering device on the table (e.g. IR device on a table that flickers but is not visible to the human eye). For example, in some implementations, the device is a first device and the ambient light data is first ambient light data, the method further including determining relative locations of the first device and a second device based on determining that the first ambient light data acquired at the first device and second ambient light data acquired at the second device correspond to the light source. In some implementations, the first device and second device provide different views of a virtual object based on the relative locations of the first device and the second device. In some implementations, the light source is a beacon producing light having a distinctive characteristic (e.g., a flickering IR device). This example is further illustrated with reference to FIGS. 9A-9B.

In an example implementation, the environment 1100 further includes a 3D representation unit 1140 that is configured with instructions executable by a processor to obtain the subset sensor data from the ALS tracking unit 1130 and generate a 3D model data 1142 using one or more techniques. For example, the 3D representation unit 1140 (e.g., 3D representation unit 244 of FIGS. 2 and/or 3D representation unit 344 of FIG. 3) analyzes RGB images from a light intensity camera 702 with a sparse depth map from a depth camera 704 (e.g., time-of-flight sensor) and other sources of physical environment information (e.g., camera positioning information such as VIO data 1122 from the VIO unit 1120, or a camera's SLAM system, or the like) to generate 3D representation data 1142 (e.g., a 3D model for a virtual object 1130 such as object 130 of FIG. 1).

The 3D model data could be 3D representations representing the surfaces in a 3D environment using a 3D point cloud with associated semantic labels. The 3D representations may be 3D bounding boxes for each detected object of interest, such as object 130, table 140, and chair 142. In some implementations, the 3D model data 1142 is a 3D reconstruction mesh that is generated using a meshing algorithm based on depth information detected in the physical environment that is integrated (e.g., fused) to recreate the physical environment. A meshing algorithm (e.g., a dual marching cubes meshing algorithm, a poisson meshing algorithm, a tetrahedral meshing algorithm, or the like) can be used to generate a mesh representing a room (e.g., physical environment 105) and/or object(s) within a room (e.g., object 130, table 140, chair 142, etc.). In some implementations, for 3D reconstructions using a mesh, to efficiently reduce the amount of memory used in the reconstruction process, a voxel hashing approach is used in which 3D space is divided into voxel blocks, referenced by a hash table using their 3D positions as keys. The voxel blocks are only constructed around object surfaces, thus freeing up memory that would otherwise have been used to store empty space. The voxel hashing approach is also faster than competing approaches at that time, such as octree-based methods. In addition, it supports streaming of data between the GPU, where memory is often limited, and the CPU, where memory is more abundant.

In some implementations, the 3D representation unit 1140 includes an integration unit that is configured with instructions executable by a processor to obtain the subset of image data (e.g., light intensity data 1103, depth data 1105, etc.) and positioning information (e.g., camera pose information from the VIO unit 1120) and integrate (e.g., fuse) the subset of image data using one or more known techniques. For example, the image integration unit receives a subset of depth image data 1105 (e.g., sparse depth data) and a subset of intensity image data 1103 (e.g., RGB) from the image sources (e.g., light intensity camera 1102 and depth camera 1104), and integrates the subset of image data and generates 3D data. The 3D data can include a dense 3D point cloud (e.g., imperfect depth maps and camera poses for a plurality of image frames around the object) that is sent to the 3D representation unit 1140. The 3D data can also be voxelized.

In some implementations, the 3D representation unit 1140 includes a semantic segmentation unit that is configured with instructions executable by a processor to obtain a subset the light intensity image data (e.g., light intensity data 1103) and identify and segment wall structures (wall, doors, windows, etc.) and objects (e.g., person, table, teapot, chair, vase, etc.) using one or more known techniques. For example, the segmentation unit receives a subset of intensity image data 1103 from the image sources (e.g., light intensity camera 1102), and generates segmentation data (e.g., semantic segmentation data such as RGB-S data). In some implementations, a segmentation unit uses a machine learning model, where a semantic segmentation model may be configured to identify semantic labels for pixels or voxels of image data. In some implementations, the machine learning model is a neural network (e.g., an artificial neural network), decision tree, support vector machine, Bayesian network, or the like.

In some implementations, the 3D representation unit 1140 involves rendering a virtual object (e.g., virtual object 1130) using light source estimation from the ALS tracking unit 1130. For example, a virtual object 1130 moving across a viewing area in an XR environment (e.g., example environment 1144) would appear differently if there was one yellow light and one white light at different locations, there would be different color shadows, etc. For example, in some implementations, the light source is a first light source that generates a first type of lighting (e.g., yellow light), wherein the physical environment further includes a second light source that generates a second type of lighting (e.g., white light) that is different than the first type of lighting, the method further including providing, at the device, an XR environment that includes a virtual object within a view of the physical environment. In some implementations, the method further includes determining probabilistic estimates of 3D locations of the first light source and the second light source during movement of the virtual object from a first location to a second location, wherein a first location of the virtual object is closer to the first light source than the second light source, and a second location of the virtual object is closer to the second light source than the first light source. In some implementations, the method further includes determining, at the first location of the virtual object, a first light source estimation effect of the first light source and the second light source based on the location of the virtual object with respect to the first light source and the second light source and based on the first type of lighting generated by the first light source and the second type of lighting generated by the second light source, providing, based on the first light source estimation effect, the virtual object at the first location, determining, at the second location of the virtual object, a second light source estimation effect of the first light source and the second light source based on the location of the virtual object with respect to the first light source and the second light source and based on the first type of lighting generated by the first light source and the second type of lighting generated by the second light source, and providing, based on the second light source estimation effect, the virtual object at the second location. This example is further illustrated with reference to FIG. 10.

In some implementations, the image composition pipeline may include virtual content (e.g., a virtual box placed on the table 135 in FIG. 1) that is generated for an extended reality (XR) environment. In some implementations, the operating systems 230, 330 includes built in XR functionality, for example, including a XR environment application or viewer that is configured to be called from the one or more applications 240, 340 to display a XR environment within a user interface. For example, the systems described herein may include a XR unit that is configured with instructions executable by a processor to provide a XR environment that includes depictions of a physical environment including real physical objects and virtual content. A XR unit can generate virtual depth data (e.g., depth images of virtual content) and virtual intensity data (e.g., light intensity images (e.g., RGB) of the virtual content). For example, one of the applications 240 for the server 110 or applications 340 for the device 120 could include a XR unit that is configured with instructions executable by a processor to provide a XR environment that includes depictions of a physical environment including real objects or virtual objects. The virtual objects may be positioned based on the detection, tracking, and representing of objects in 3D space relative to one another based on stored 3D models of the real objects and the virtual objects, for example, using one or more of the techniques disclosed herein.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a device having a processor, an ambient light sensor (ALS), and a motion sensor:
   acquiring ambient light data from the ALS during movement of the device in a physical environment, the ambient light data corresponding to diffuse light received by the ALS in the physical environment, the physical environment comprising a light source;
   acquiring motion data from the motion sensor during the movement of the device;
   determining, based on the ambient light data and the motion data, estimates of three-dimensional (3D) locations of the light source with respect to the device during the movement of the device; and
   tracking, by the device and based on the ambient light data and the determined estimates of the 3D locations of the light source with respect to the device during the movement of the device, a 3D location of the device in a 3D coordinate system.

2. The method of claim 1, wherein the ALS is configured to generate one or more light characteristic values corresponding to diffused light from the light source.

3. The method of claim 1, wherein determining estimates comprises determining probabilistic estimates.

4. The method of claim 3, wherein determining probabilistic estimates comprises generating and updating a 3D probability map.

5. The method of claim 3, wherein the light source is a first light source, and wherein determining probabilistic estimates comprises tracking probabilistic location estimates for the first light source and a second light source in the physical environment, wherein the tracking is based on differences in spectral properties of the first light source and the second light source.

6. The method of claim 1, wherein determining estimates comprises determining deterministic estimates.

7. The method of claim 6, wherein determining deterministic estimates comprises iteratively updating location estimates for the light source in the physical environment at a particular frequency, each iteration comprising:
   determining a location estimate for the light source based on the 3D location; and
   updating the 3D location of the location estimate for the light source in a 3D grid, the 3D grid including a notification of the location estimate of the light source.

8. The method of claim 1, wherein the tracking provides continuity between time periods during presentation of an extended reality (XR) environment during which a second tracking technique is altered based on inclusion or exclusion of virtual content.

9. The method of claim 1, wherein:
   during a first time period, tracking the device using visual inertial odometry (VIO), positioning a virtual object in an extended reality (XR) environment based on the tracking of the device during the first time period, and presenting a first view of the XR environment including the virtual object;
   during a second time period after the first time period, presenting a second view of the XR environment and, based on the second view excluding the virtual object, tracking the device using the ambient light data and altering the tracking of the device using VIO; and
   during a third time period after the second time period, positioning the virtual object in a third view of the XR environment based on tracking the device using the ambient light data and using VIO.

10. The method of claim 1, wherein the device is a first device and the ambient light data is first ambient light data, the method further comprising determining relative locations of the first device and a second device based on determining that the first ambient light data acquired at the first device and second ambient light data acquired at the second device correspond to the light source.

11. The method of claim 10, wherein the first device and the second device provide different views of a virtual object based on the relative locations of the first device and the second device.

12. The method of claim 10, wherein the light source is a beacon producing light having a distinctive characteristic.

13. The method of claim 1, wherein the light source is a first light source that generates a first type of lighting, wherein the physical environment further comprises a second light source that generates a second type of lighting that is different than the first type of lighting, the method further comprising providing, at the device, an extended reality (XR) environment that includes a virtual object within a view of the physical environment.

14. The method of claim 13, further comprising determining probabilistic estimates of 3D locations of the first light source and the second light source to provide the virtual object with an illumination characteristic during movement of the virtual object from a first location to a second location, wherein a first location of the virtual object is closer to the first light source than the second light source, and a second location of the virtual object is closer to the second light source than the first light source.

15. The method of claim 14, further comprising:
determining, at the first location of the virtual object, a first light source estimation effect of the first light source and the second light source based on the location of the virtual object with respect to the first light source and the second light source and based on the first type of lighting generated by the first light source and the second type of lighting generated by the second light source;
providing, based on the first light source estimation effect, the virtual object at the first location;
determining, at the second location of the virtual object, a second light source estimation effect of the first light source and the second light source based on the location of the virtual object with respect to the first light source and the second light source and based on the first type of lighting generated by the first light source and the second type of lighting generated by the second light source; and
providing, based on the second light source estimation effect, the virtual object at the second location.

16. The method of claim 1, wherein the ambient light data comprises a light direction or a light source region of the physical environment.

17. The method of claim 1, wherein the ALS comprises a row or grid of sensing elements configured to determine a light direction or light source region of the physical environment.

18. The method of claim 1, further comprising:
acquiring image data of the physical environment captured via a camera on the device, the image data acquired at a frequency that is lower than a frequency the ambient light data and the motion data is acquired;
determining, based on the image data, the 3D location of the light source with respect to the device; and
updating, based on the determined 3D location of the light source from the image data, the estimated 3D location of the light source that is based on the ambient light data and the motion data.

19. A device comprising:
an ambient light sensor (ALS);
a motion sensor;
a non-transitory computer-readable storage medium; and
one or more processors coupled to the non-transitory computer-readable storage medium, wherein the non-transitory computer-readable storage medium comprises program instructions that, when executed on the one or more processors, cause the system one or more processors to perform operations comprising:
acquiring ambient light data from the ALS during movement of the device in a physical environment, the ambient light data corresponding to diffuse light received by the ALS in the physical environment, the physical environment comprising a light source;
acquiring motion data from the motion sensor during the movement of the device;
determining, based on the ambient light data and the motion data, estimates of three-dimensional (3D) locations of the light source with respect to the device during the movement; and
tracking, by the device and based on the ambient light data and the determined estimates of the 3D locations of the light source with respect to the device during the movement of the device, a 3D location of the device in a 3D coordinate system.

20. A non-transitory computer-readable storage medium, storing computer-executable program instructions on a computer to perform operations comprising:
acquiring ambient light data from an ambient light sensor (ALS) during movement of a device in a physical environment, the ambient light data corresponding to diffuse light received by the ALS in the physical environment, the physical environment comprising a light source;
acquiring motion data from a motion sensor during the movement of the device;
determining, based on the ambient light data and the motion data, estimates of three-dimensional (3D) locations of the light source with respect to the device during the movement of the device; and
tracking, by the device and based on the ambient light data and the determined estimates of the 3D locations of the light source with respect to the device during the movement of the device, a 3D location of the device in a 3D coordinate system.

\* \* \* \* \*